United States Patent
Leavitt et al.

(10) Patent No.: US 6,918,091 B2
(45) Date of Patent: Jul. 12, 2005

(54) USER DEFINABLE INTERFACE SYSTEM, METHOD AND COMPUTER PROGRAM PRODUCT

(75) Inventors: Joseph M. Leavitt, Huntsville, AL (US); Scott A. Mills, Hilliard, OH (US)

(73) Assignee: Change Tools, Inc., Huntsville, AL (US)

(*) Notice: Subject to any disclaimer, the term of this patent is extended or adjusted under 35 U.S.C. 154(b) by 607 days.

(21) Appl. No.: 09/986,765

(22) Filed: Nov. 9, 2001

(65) Prior Publication Data

US 2002/0085037 A1 Jul. 4, 2002

Related U.S. Application Data

(60) Provisional application No. 60/325,179, filed on Sep. 28, 2001, and provisional application No. 60/247,643, filed on Nov. 9, 2000.

(51) Int. Cl.[7] ............................................... G06F 3/14
(52) U.S. Cl. .................. 715/765; 715/779; 715/834; 715/826
(58) Field of Search ................................. 345/765, 769, 345/835, 837, 840, 841, 843, 779, 834, 866, 762, 847, 764, 808, 809, 810, 825, 826; 717/100, 110, 111, 113, 120, 121

(56) References Cited

U.S. PATENT DOCUMENTS

| | | | |
|---|---|---|---|
| 4,772,882 A | 9/1988 | Mical | 340/709 |
| 4,896,291 A | 1/1990 | Gest et al. | 364/900 |
| 5,345,550 A | 9/1994 | Bloomfield | 395/156 |
| 5,490,245 A * | 2/1996 | Wugofski | 345/837 |
| 5,513,310 A | 4/1996 | Megard et al. | 395/161 |
| 5,581,670 A | 12/1996 | Bier et al. | 395/326 |
| 5,589,856 A | 12/1996 | Stein et al. | 345/173 |
| 5,602,997 A | 2/1997 | Carpenter et al. | 395/349 |
| 5,644,737 A | 7/1997 | Tuniman et al. | 395/352 |
| 5,664,133 A | 9/1997 | Malamud et al. | 345/352 |
| 5,678,015 A | 10/1997 | Goh | 395/355 |
| 5,689,667 A | 11/1997 | Kurtenbach | 395/352 |
| 5,701,424 A | 12/1997 | Atkinson | 395/353 |
| 5,706,448 A | 1/1998 | Blades | 395/326 |
| 5,706,456 A | 1/1998 | Dupper et al. | 395/349 |
| 5,721,853 A | 2/1998 | Smith | 395/353 |
| 5,737,557 A | 4/1998 | Sullivan | 395/340 |
| 5,737,560 A | 4/1998 | Yohanan | 395/349 |
| 5,745,116 A | 4/1998 | Pisutha-Arnond | 345/358 |
| 5,745,717 A | 4/1998 | Vayda et al. | 395/352 |

(Continued)

FOREIGN PATENT DOCUMENTS

EP 0 662 655 7/1995

OTHER PUBLICATIONS

"User–Controlled Move, Copy or Delete of Menu Graphical User Interface", IBM Technical Disclosure Bulletin, vol. 37, No. 3, Mar. 1, 1994, pp. 219–220.*

International Search Report, International Application No. PCT/US01/43022/ dated Nov. 18, 2004, 6 pages.

(Continued)

Primary Examiner—Raymond J. Bayerl
(74) Attorney, Agent, or Firm—Sterne, Kessler, Goldstein & Fox P.L.L.C.

(57) ABSTRACT

In a cursor-based computing environment having a display, a user definable interface (UDI) is displayed upon activation by a user. The UDI has a plurality of levels each having a plurality of buttons and is displayed in a selectable position about a pointer position in a display area to reduce pointer commute. The user selects a visual appearance and shape of the UDI, and the number of buttons. The user assigns a command to each of the plurality of buttons at each of the plurality of levels by dragging and dropping from one or more applications of the apparatus.

31 Claims, 26 Drawing Sheets

U.S. PATENT DOCUMENTS

| | | | |
|---|---|---|---|
| 5,748,891 A | 5/1998 | Fleming et al. | 375/200 |
| 5,754,173 A | 5/1998 | Hiura et al. | 345/333 |
| 5,754,174 A | 5/1998 | Carpenter et al. | 345/334 |
| 5,790,820 A | 8/1998 | Vayda et al. | 395/352 |
| 5,798,760 A | 8/1998 | Vayda et al. | 345/352 |
| 5,805,167 A | 9/1998 | van Cruyningen | 345/353 |
| 5,812,805 A * | 9/1998 | Kitayama et al. | 345/840 |
| 5,818,445 A | 10/1998 | Sanderson et al. | 345/334 |
| 5,825,357 A | 10/1998 | Malamud et al. | 345/340 |
| 5,828,360 A | 10/1998 | Anderson et al. | 345/146 |
| 5,828,376 A * | 10/1998 | Solimene et al. | 345/840 X |
| 5,838,321 A | 11/1998 | Wolf | 345/343 |
| 5,852,440 A | 12/1998 | Grossman et al. | 345/348 |
| 5,874,966 A | 2/1999 | Polimeni et al. | 345/431 |
| 5,914,714 A | 6/1999 | Brown | 345/339 |
| 5,926,178 A | 7/1999 | Kurtenbach | 345/352 |
| 5,933,141 A | 8/1999 | Smith | 345/339 |
| 5,940,076 A | 8/1999 | Sommers et al. | 345/339 |
| 5,943,039 A | 8/1999 | Anderson et al. | 345/146 |
| 5,943,678 A | 8/1999 | Hocker et al. | 707/511 |
| 5,973,666 A | 10/1999 | Challener et al. | 345/146 |
| 6,002,402 A | 12/1999 | Schacher | 345/352 |
| 6,002,708 A | 12/1999 | Fleming et al. | 375/200 |
| 6,037,937 A | 3/2000 | Beaton et al. | 345/339 |
| 6,104,399 A | 8/2000 | Völkel | 345/352 |
| 6,111,614 A | 8/2000 | Mugura et al. | 348/569 |
| 6,118,427 A | 9/2000 | Buxton et al. | 345/113 |
| 6,121,965 A | 9/2000 | Kenney et al. | 345/339 |
| 6,133,915 A | 10/2000 | Arcuri et al. | 345/334 |
| 6,188,399 B1 | 2/2001 | Voas et al. | 345/334 |
| 6,201,539 B1 | 3/2001 | Miller et al. | 345/334 |
| 6,208,341 B1 | 3/2001 | van Ee et al. | 345/339 |
| 6,215,488 B1 | 4/2001 | Bloem et al. | 345/334 |
| 6,304,746 B1 | 10/2001 | Fascenda et al. | 455/31.3 |
| 6,341,270 B1 | 1/2002 | Esposito et al. | 705/26 |
| 6,385,268 B1 | 5/2002 | Fleming et al. | 375/377 |
| 6,400,754 B2 | 6/2002 | Fleming et al. | 375/140 |
| 6,448,987 B1 * | 9/2002 | Easty et al. | 345/834 |
| 6,466,937 B1 | 10/2002 | Fascenda | 707/10 |
| 6,535,885 B1 | 3/2003 | Nardone et al. | 707/101 |
| 6,546,374 B1 | 4/2003 | Esposito et al. | 705/27 |
| 6,549,219 B2 * | 4/2003 | Selker | 345/834 |
| 6,621,532 B1 * | 9/2003 | Mandt | 348/841 |

OTHER PUBLICATIONS

IBM Technical Disclosure Bulletin, Menu Display Method For Integrated Input/Display Device, Jan. 1990, pp. 370–372.

Letter to Mr. Bentley from M. Colcock and J. Leavitt, regarding Microstation User Interface, dated Jan. 3, 1995, 1 page.

Agreement regarding Bullseye Interface System, dated Feb. 28, 1995, 4 pages.

Colcock, M. and Leavitt, J., "The Looking Glass," Apr. 5, 1995, 2 pages.

Colcock, M. and Leavitt, J., "The Looking Glass Interface," Minutes of meeting at IGUG, May 10, 1995, 5 pages.

Letter to Frank Veal from M. Colcock and J. Leavitt, regarding Microstation User Interface, Aug. 6, 1995, 12 pages.

Complaint filed in the Circuit Court of Lauderdale County, Alabama, Case No. CN02–604, filed Aug. 19, 2002, 20 pages.

* cited by examiner

USER DEFINABLE INTERFACE SYSTEM, METHOD AND COMPUTER PROGRAM PRODUCT

CROSS-REFERENCE TO RELATED APPLICATIONS

This application claims priority to Provisional U.S. Patent Application Nos. 60/247,643, filed Nov. 9, 2000, and 60/325,179, filed Sep. 28, 2001, which are incorporated herein by reference in their entireties.

COPYRIGHT AND TRADEMARK NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Zenu is a trademark of Change Tools Inc. Unix is a registered trademark of The Open Group. Microsoft, Microsoft Windows, Window NT and/or other Microsoft products referenced herein are either trademarks or registered trademarks of Microsoft Corporation. Various terms and icons in the figures may be trademarks or registered trademarks of other companies.

BACKGROUND OF THE INVENTION

1. Field of the Invention

The present invention relates generally to the field of user interfaces within a data processing system and more particularly, to a user definable interface overlay capable of manipulating multiple functions and windows in a graphical display.

2. Background Art

The manipulation of data in a data processing system is well known in the art and the large amounts of data that are available to the user of a modern state-of-the-art data processing system often become overwhelming in magnitude and complexity. Similarly, many consumer devices have interfaces requiring human interaction to control the device or a peripheral connected thereto. As a result of this increasing complexity, simplified interface methods and systems are needed between the user and the data processing system or device.

One example of a simplified system and method is the utilization of a graphic user interface ("GUI"). A GUI is an interface system by which a user interacts with system components, and/or system applications via a visible display having, for example, windows or view ports, icons, menus, pointing devices, etc. One of the many advantages of GUIs in the computer field is their ability to represent computer application programs, documents and data as graphical display elements or icons as opposed to text-based elements.

Menu driven software programs are a specific example of a GUI. Such software programs enable a user to chose from a list of items that can be accessed directly by pulling down different menus from the menu bar, rather than requiring the user to remember the name and syntax of a command. GUIs were developed so that novice users could more easily make a selection among available commands and, thus, operate computers. In the computer field, these menu driven software programs eventually lead to the development of a windowing environment in which the user may have multiple programs and files operable at one time with a selection among multiple commands. Each command appears in a window of the program data file being worked on. To effect selection within applications and switching between windows, a hand operated pointing device becomes a critical component of a computer system running windows based software applications. One example pointing device is a mouse.

Applications running in a windowed environment typically have a main menu bar with more specific commands being displayed in "pull down" menus stemming from specific portions of the main menu bar command headings. When the user wants to execute a command, the user must move the pointing device so that a cursor on the display points to the command on the desired menu heading. The command heading activates a pull down menu that displays a plurality of commands available for execution. In some instances, computer systems create hierarchies of menus (also referred to as "nesting") leading to submenus to avoid excessively large menus or inappropriate menu chains. A command from the pull down menu may then be selected for execution. In accordance with conventional methods, only one command is executed at any given time since the pull down menu is typically limited to a single column of possible choices or objects. Movement amongst the menu bar and the pull down menus requires a great deal of movement of the pointing device (and thereby the cursor) to manipulate multiple windows or applications and their related commands. This movement is called "cursor commute." This results in a time-consuming, less efficient and confusing user interface. Therefore, it is difficult for the young, the elderly, handicapped, or any novice user to traverse and coordinate the position of the pointing device and, thus, the cursor with which the execution is made.

One attempt to avoid a long horizontal list of menu options has resulted in "pop-up menus." These menus have the advantage of bringing the menu to the cursor, rather than having to move the cursor to the menu. When a trigger event occurs, for example depressing the right button (known in the art as "right clicking") on the pointing device (e.g., a mouse), a window is displayed next to the cursor position and the menu items to be related are listed. When the user chooses a menu item, the menu is removed and the action corresponding to the item is initiated. Pop-up menus, however, are limited to the number of commands they can contain and they often cover up part of the work area.

Pie menus enhance pop-up menus by allowing directional selection to choose menu items. A pie menu is similar to a pop-up menu, but the pie shaped menu items surround the cursor position in a circle. In their two-dimensional form, pie menus may be round menus. The menu items are positioned around a small inactive region in the center of the circle like slices of a pie, rather than in rows or columns as in conventional linear menus. In operation, the cursor is initially located in the center of the pie in a small inactive region. The active regions representing the menu items are therefore adjacent the cursor, but each in a different direction, and menu items are selected by clicking the mouse and then pointing in the direction of the menu item.

What is needed is an interface to provide users with a definable interface that minimizes cursor commute and does not clutter the work area.

BRIEF SUMMARY OF THE INVENTION

The present invention relates to a user definable interface that minimizes cursor commute.

The present invention is to be implemented in a cursor-based computing environment having a display. According to the present invention a user definable interface (UDI) is displayed upon activation by a user, wherein the UDI has a plurality of buttons and is displayed in a relative position about a cursor position to reduce cursor commute. The present invention permits the user to select a visual appearance and shape of the UDI, and the number of buttons. The present invention also permits the user to assign a command to each of the plurality of buttons by dragging and dropping from one or more applications of the apparatus.

The present invention further permits the user to form a first group of buttons and at least a second group of buttons. The user is permitted to assign a first icon representing a first specific one of the one or more applications to a first given button of the first group and assign commands, associated with the first specific one of the one or more applications to the second group of buttons. The present invention further permits the user to assign a second icon representing a second specific one of the one or more applications to a second given button of the first group and assign commands, associated with the second specific one of the one or more applications to the second group of buttons. The appearance of, and commands associated with, the second group of buttons change based on which button of the first group of buttons is selected.

The present invention further permits the user to activate the UDI by the user comprises at least one of clicking a hotkey, clicking a mouse button, or turning on the apparatus.

In a data processing system having a user defined interface (UDI), an alternative a method of the present invention comprises the steps of managing the UDI in response to user commands, providing at least one template that defines position for a plurality of command regions corresponding to the UDI, and providing a theme that defines attributes and commands for the for a plurality of command regions.

The present invention is also characterized as an apparatus comprising a user defined interface (UDI) having a plurality of command regions, a command processor that manages an interactive skin (IS) and a customizer. The IS includes a template that defines position information for the plurality of command regions corresponding to the UDI and at least one of default attributes and default commands for the plurality of command regions, and a theme that defines attributes if the template only defines default commands for the plurality of command regions, or commands if the template only defines default attributes for the plurality of command regions. The customizer permits user replacing or user extending of the default attributes or the default commands of one or more of the plurality of command regions. Typically the user is an end user of the apparatus, but the invention is not so limited.

The customizer permits a user to: hide the UDI; hide a portion of the UDI; have the UDI display upon launch; launch the UDI from a system tray; and scale the size of the UDI. Moreover, the can be UDI is displayed in a relative position about a cursor position. The customizer permits a user to define that relative position.

Another aspect of the present invention is directed to a user definable interface that enables each user to control interaction with any given software package or operating system through a customized set of interactive nestable commands and functions based upon user preference with the convenience of edit functionality.

Another aspect of the present invention relates to a user definable interface that allows selection of multiple actions with a single user interaction.

It is also another aspect of the present invention to provide a user definable interface that is invisible until prompted by the user and can be set to disappear again after a user selection.

It is another aspect the present invention is directed to a user definable interface that is executable during work on an active file.

Another aspect of the present invention relates to a device, method and computer program product that provide an efficient on-screen work environment tailored to the user's needs.

It is yet another aspect of the present invention to provide a translucent executable user definable interface on a display screen that enables a user to observe the work space depicted beneath the user definable interface through a centrally positioned window in the user definable interface.

It is another aspect of the present invention to permit selection of commands or functions by "clicking" an icon from a plurality of icons that enclose or partially enclose a central window. Clicking on a button causes one or more additional interface buttons to appear, launches an application, opens a file, or opens a container.

Another aspect of the present invention is directed to an Internet browser and application launching tool.

The user definable interface of the present invention provides a number of advantages over other interface overlays known in the art. For example, it allows users to customize commands according to the user's preference. In addition, it eliminates screen clutter by being invisible until activated and disappearing once a selection is made. Further, the present invention provides the user with the ability to view the work area on a display screen while the user definable interface is activated.

These and additional features and advantages of the invention will be set forth in the detailed description that follows, and in part will be readily available to those skilled in the art from that description or recognized by practicing the invention as described herein.

It is to be understood that both the foregoing general description and the following detailed description are merely exemplary of the invention and are intended to provide an overview of framework for understanding the nature and character of the invention as it is claimed.

BRIEF DESCRIPTION OF THE DRAWINGS/ FIGURES

The features and advantages of the present invention will become more apparent from the detailed description set forth below when taken in conjunction with the drawings/ figures in which like reference numbers indicate identical or functionally similar elements. Additionally, the left-most digit of a reference number identifies the drawing in which the reference number first appears.

Figure 7:
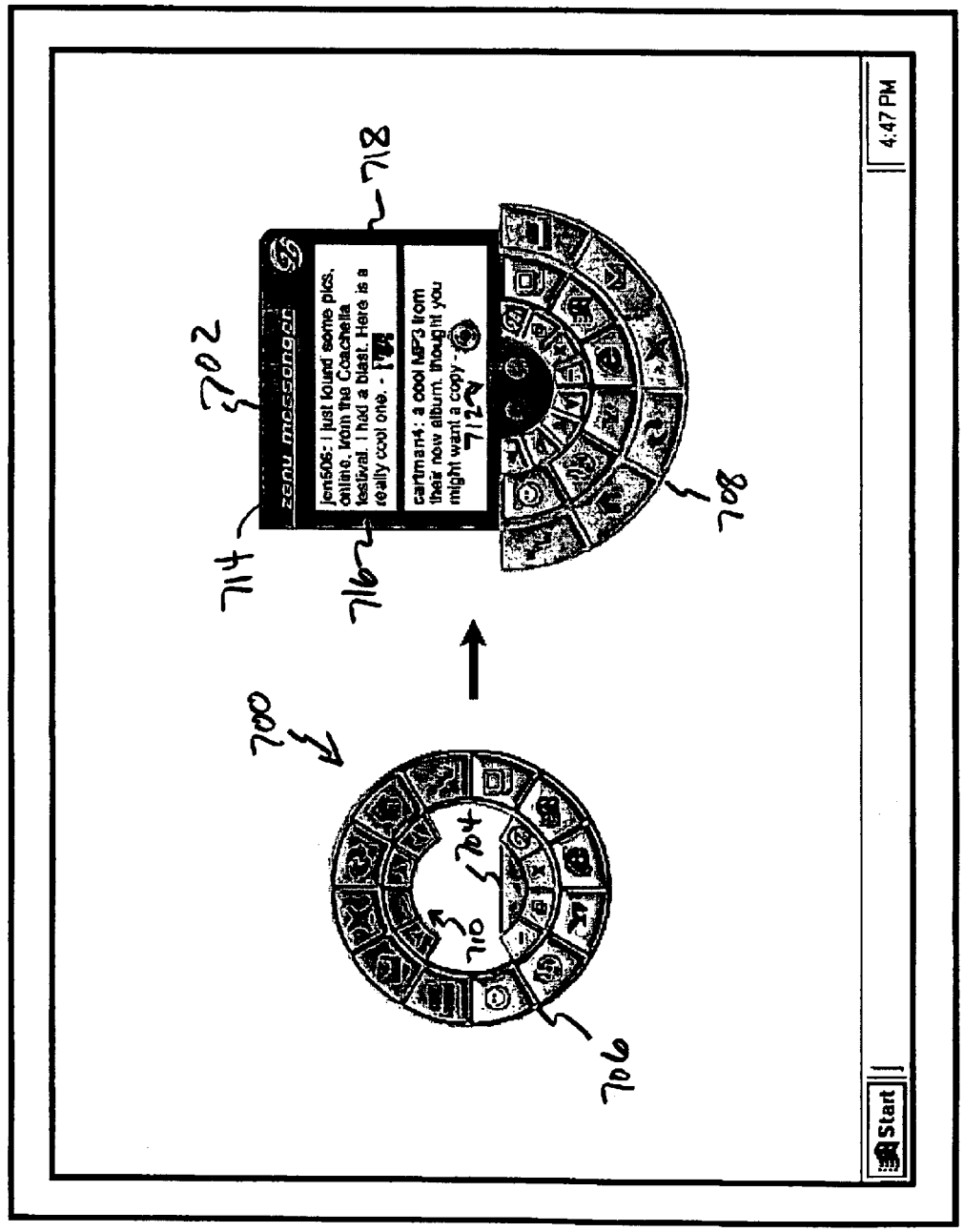

FIG. 7 illustrated a Zenu™ UDI configured with an instant messenger plug-in, in accordance with the present invention.

FIGS. 8A–F illustrate six exemplary Zenu™ UDIs, in accordance with the present invention.

Figure 9A:
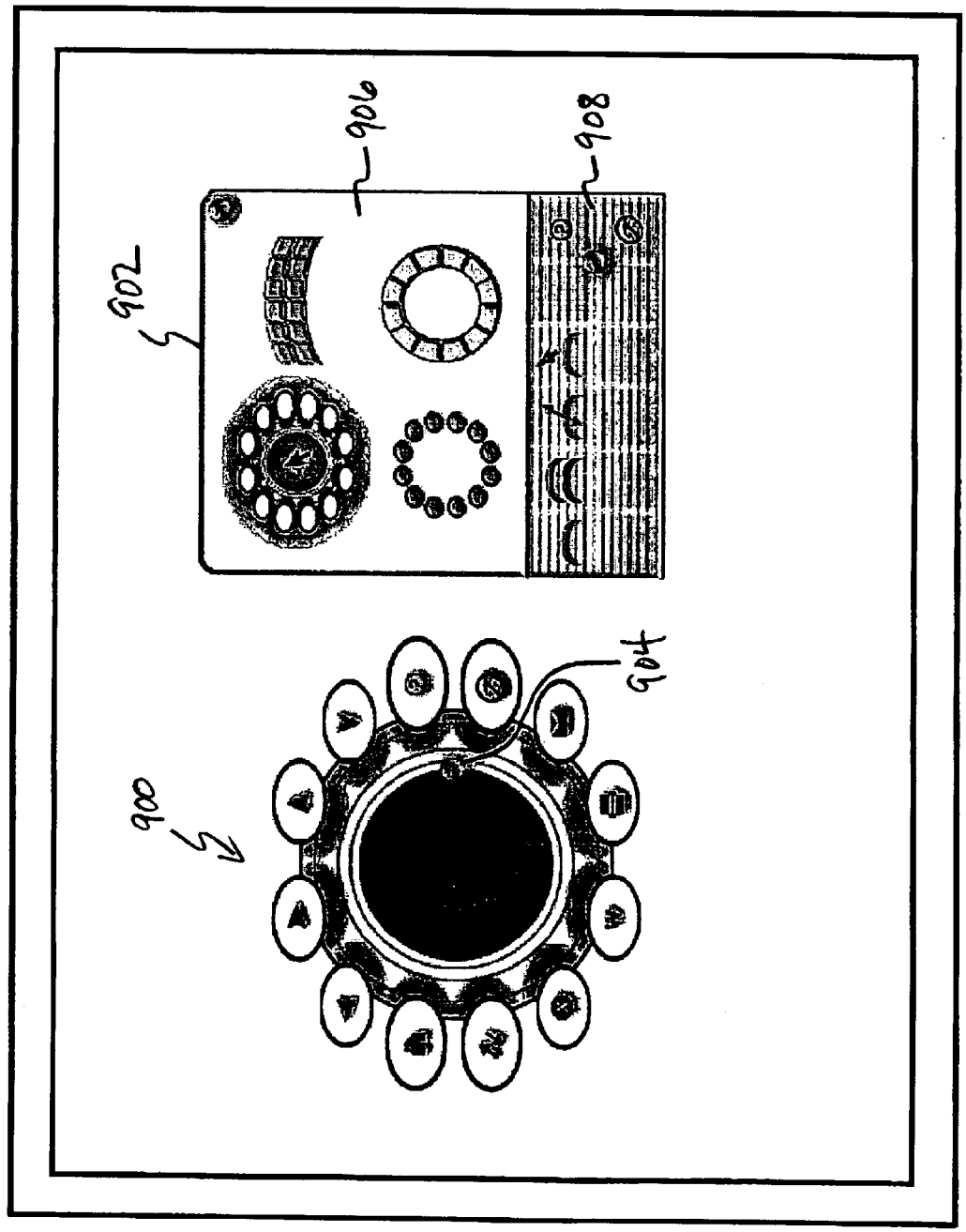

FIG. 9A illustrates a Zenu™ UDI and a interactive skin control panel, which is accessed by the user selecting Zenu™ UDI customization button, in accordance with the present invention.

Figure 9B:
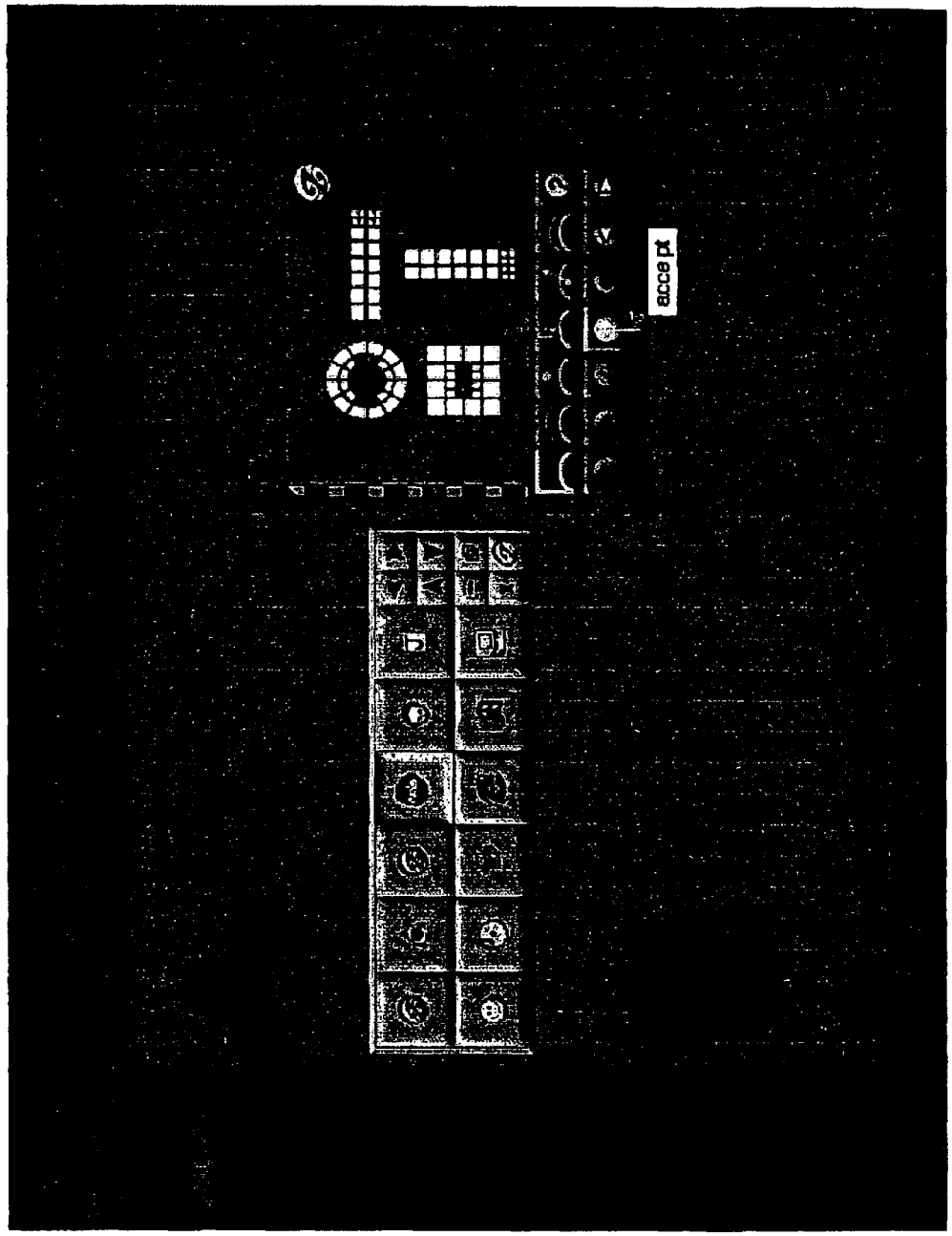

FIG. 9B illustrates an alternative to the Zenu™ UDI and a interactive skin control panel of FIG. 9A, in accordance with the present invention.

Figure 10A:
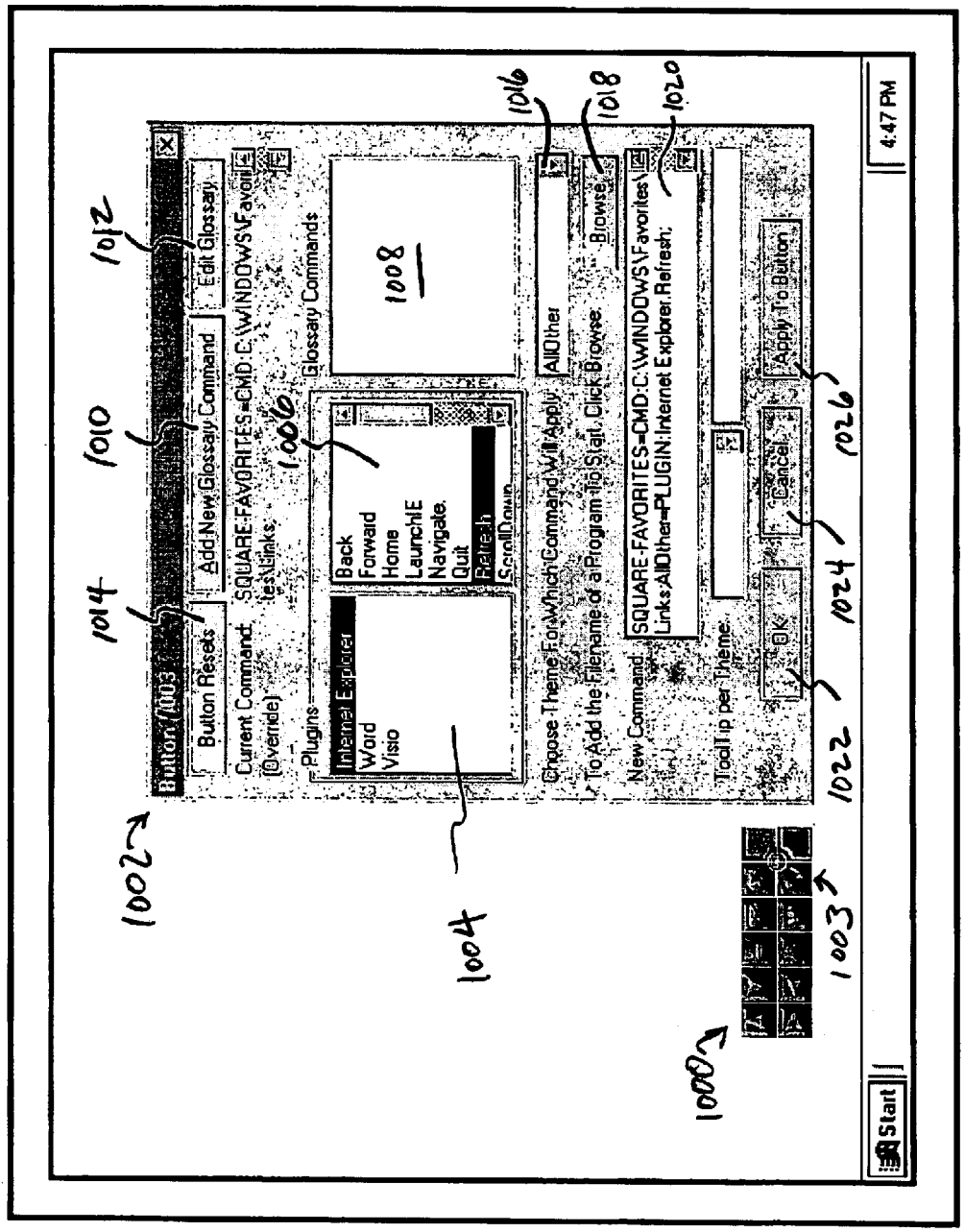

FIG. 10A illustrates a Zenu™ UDI and a functionality control panel, in accordance with the present invention.

Figure 10B:
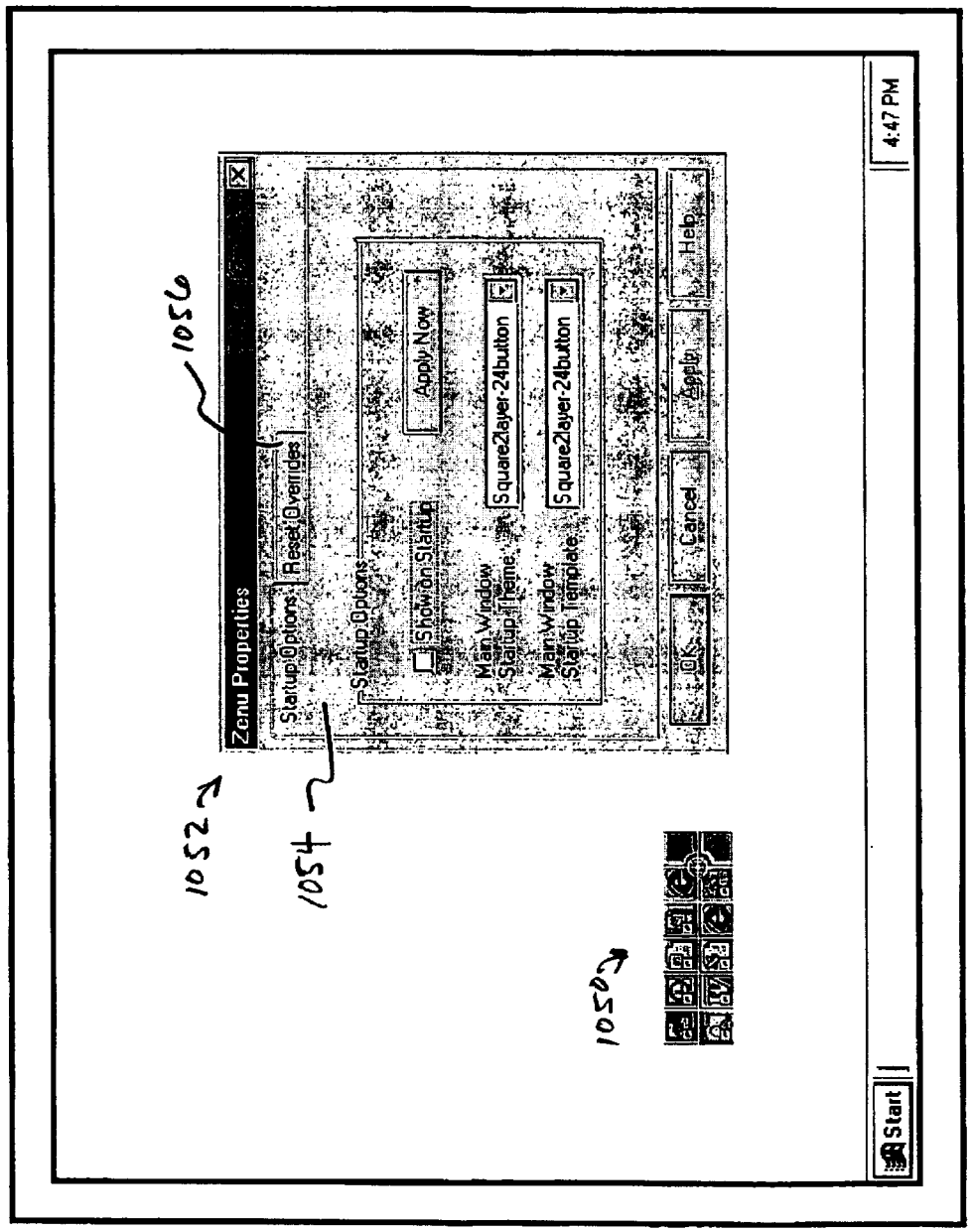

FIG. 10B illustrates a Zenu™ UDI and a properties control panel, which permits the user to define various "Startup Options", in accordance with the present invention.

Figure 11:
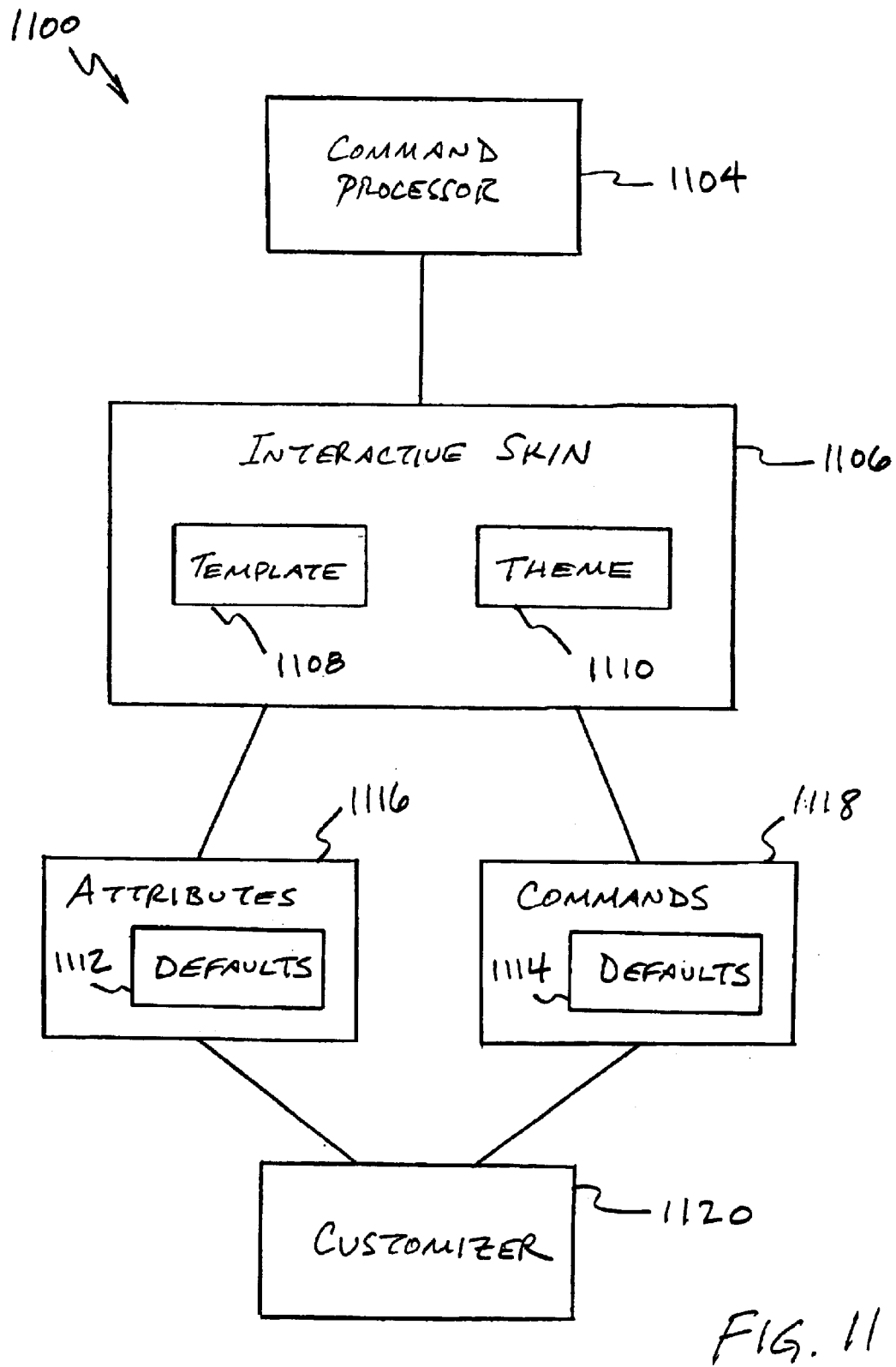

FIG. 11 depicts an exemplary architecture having a command processor that manages an interactive skin (IS), in accordance with the present invention.

FIGS. 12 through 19 are flow diagrams illustrating the operation of an exemplary Zenu™ UDI system and method according to an embodiment of the present invention.

Figure 20:
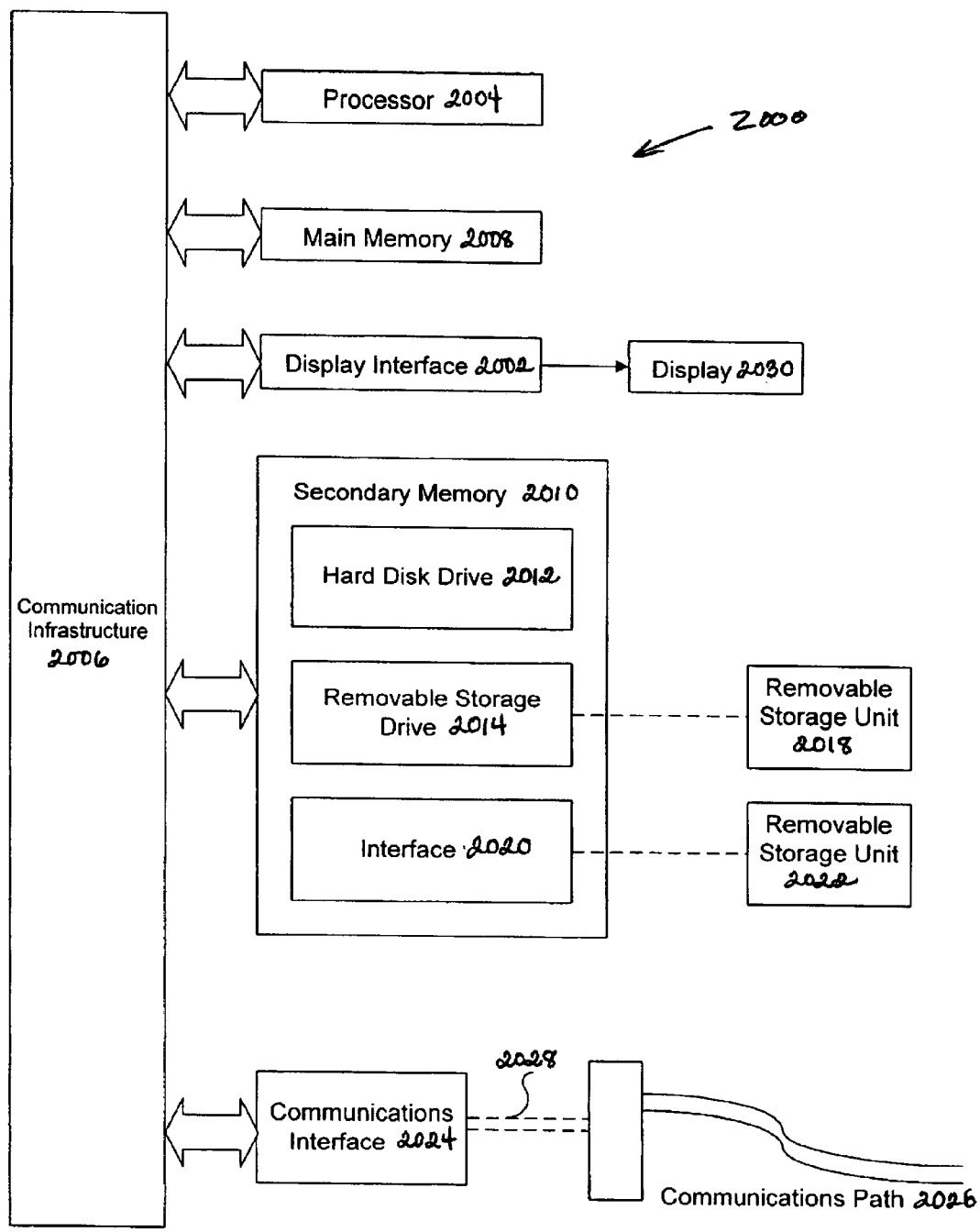

FIG. 20 illustrates an example of a computer system capable of carrying out the functionality described herein, in accordance with the present invention.

DETAILED DESCRIPTION OF THE INVENTION

The preferred embodiment of the present invention will now be discussed in detail. While specific features, configurations and arrangements are discussed, it should be understood that this is done for illustration purposes only. A person skilled in the relevant art will recognize that other steps, configurations and arrangements may be used without departing from the spirit and scope of the invention. Indeed, for the sake of brevity, conventional electronics, software and/or computer architecture, and other functional aspects of the method/apparatus (and components of the individual operating components of the apparatus) may not be described in detail herein. Furthermore, for purposes of brevity, the invention is frequently described herein as pertaining to data processing devices, such as personal computer or laptop computers, or set-top boxes in a television computing environment. It should be appreciated, however, that many other devices having a user viewable display for interaction therewith, and/or control thereof could be readily modified to included the present invention, and thus the techniques described herein could be used in connection with other such devices. Moreover, it should be understood that the spatial descriptions (e.g., "next to", "above", "below", "up", "down", etc.) made herein are for purposes of illustration only.

The term "button" is used herein according to its customary meaning to refer to a graphical representation of an electrical push-button appearing as part of a graphical user interface, as would be apparent to a person skilled in the relevant art. Moving the pointer device over the graphical "button" and pressing (or "clicking") one of the physical buttons of the pointing device, for example, starts some software action such as closing a window or deleting a file.

The term "command" is used herein to refer to a software action taken when a button is activated. A command can launch an application, open a file, or perform some predefined function or set of functions.

The term "cursor" is used herein according to its customary meaning to refer to a movable symbol on a display device that shows where the user is working, whether typing in text, drawing lines, or moving something around.

The cursor can be moved with the arrow keys or a pointing device. It usually appears in text programs as a blinking dash or rectangle, or an arrow. In graphics programs the cursor is often called a pointer, and can take many different shapes such as a brush, pencil, or hand, as would be apparent to a person skilled in the relevant art.

The term "display device" is used herein according to its customary meaning to refer to a device capable of displaying an image, such as a cathode ray tube (CRT) monitor, liquid crystal display (LCD), plasma display, or like device used to display text, graphics, images, etc., to a user, as would be apparent to a person skilled in the relevant art.

The term "pointing device" is used herein according to its customary meaning to refer to a mouse, track ball, touch pad, joy stick, voice activated control system, or the like device used to position a cursor on a display device, as would be apparent to a person skilled in the relevant art.

The terms "user definable interface" and "Zenu™ UDI" are used interchangeably herein to refer to the present invention as described below.

The term "window" or "windows" are used herein according to their customary meaning to refer to portions of the display device that are divided into areas, which function as a separate input/output device under the control of different application programs, as would be apparent to a person skilled in the relevant art. This gives the user the ability to see the output of several processes at once and to choose which one will receive input by selecting its window usually with a pointing device. WINO refers to Windows, Icons, Menus and Pointers (or maybe windows, icons, mouse, pull-down menus). The style of graphical user interface invented at Xerox PARC, later popularized by the Apple Macintosh and now available in other varieties such as the X Window System, OSF/Motif, NeWS RISC OS, and Microsoft® Windows, as would be apparent to a person skilled in the relevant art.

I. Overview

Figure 1:
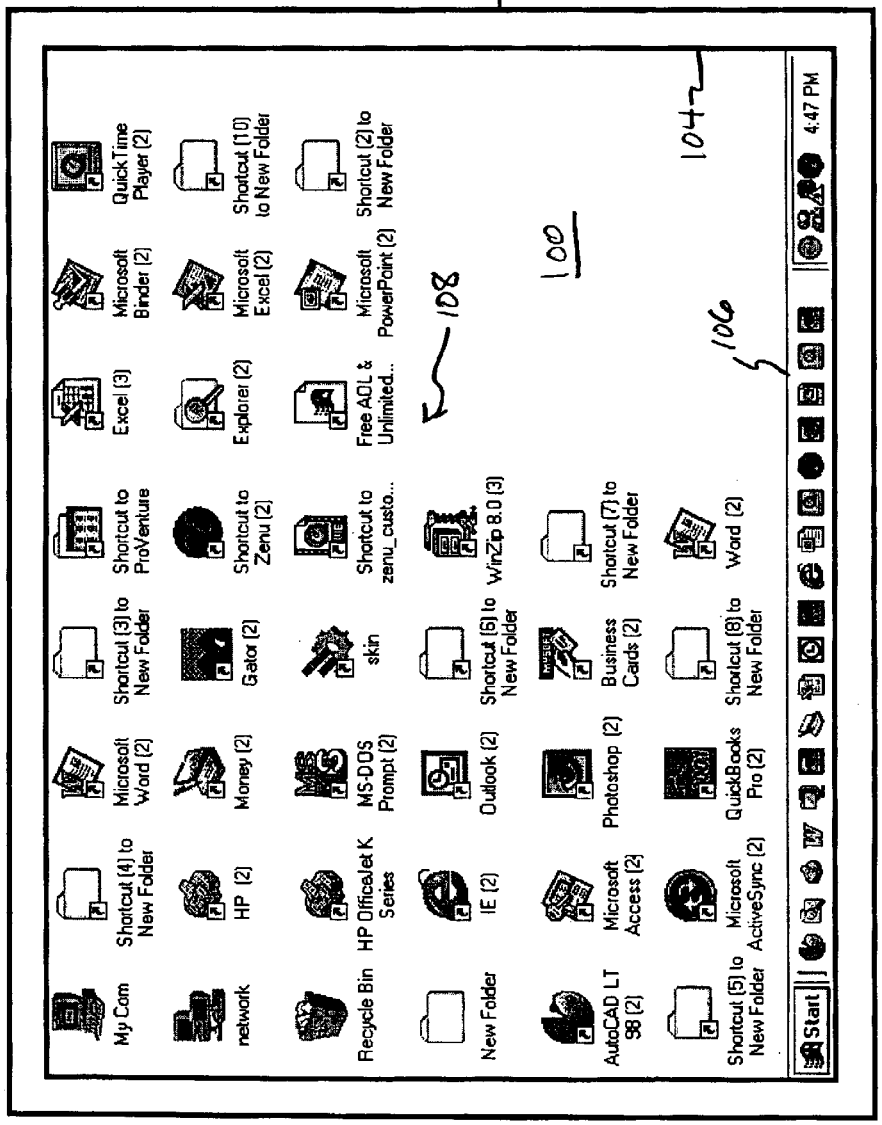
FIG. 1 is a screen grab depicting a cluttered desktop.

FIG. 1 illustrates a conventional desktop 100 as presented on a display 102 in a window 104. The desktop 100 includes a taskbar 106, and a plurality of applications, folders, files, shortcuts, and the like (referred to generally as 108) cluttering the desktop. The desktop typically occupies the whole display, and attempts to represent the top of an office desk (i.e., a real desktop). On a conventional graphical user interface, the icons on the screen resemble objects that would be found on a real desktop, such as file folders, a clock, etc. Users like to locate applications, folders, files, shortcuts, and the like on the desktop for easy access. As is typical, access is no longer easy when the desktop becomes cluttered. Among the many advantages and uses of the present invention, it brings new order to the desktop.

Figure 2A:
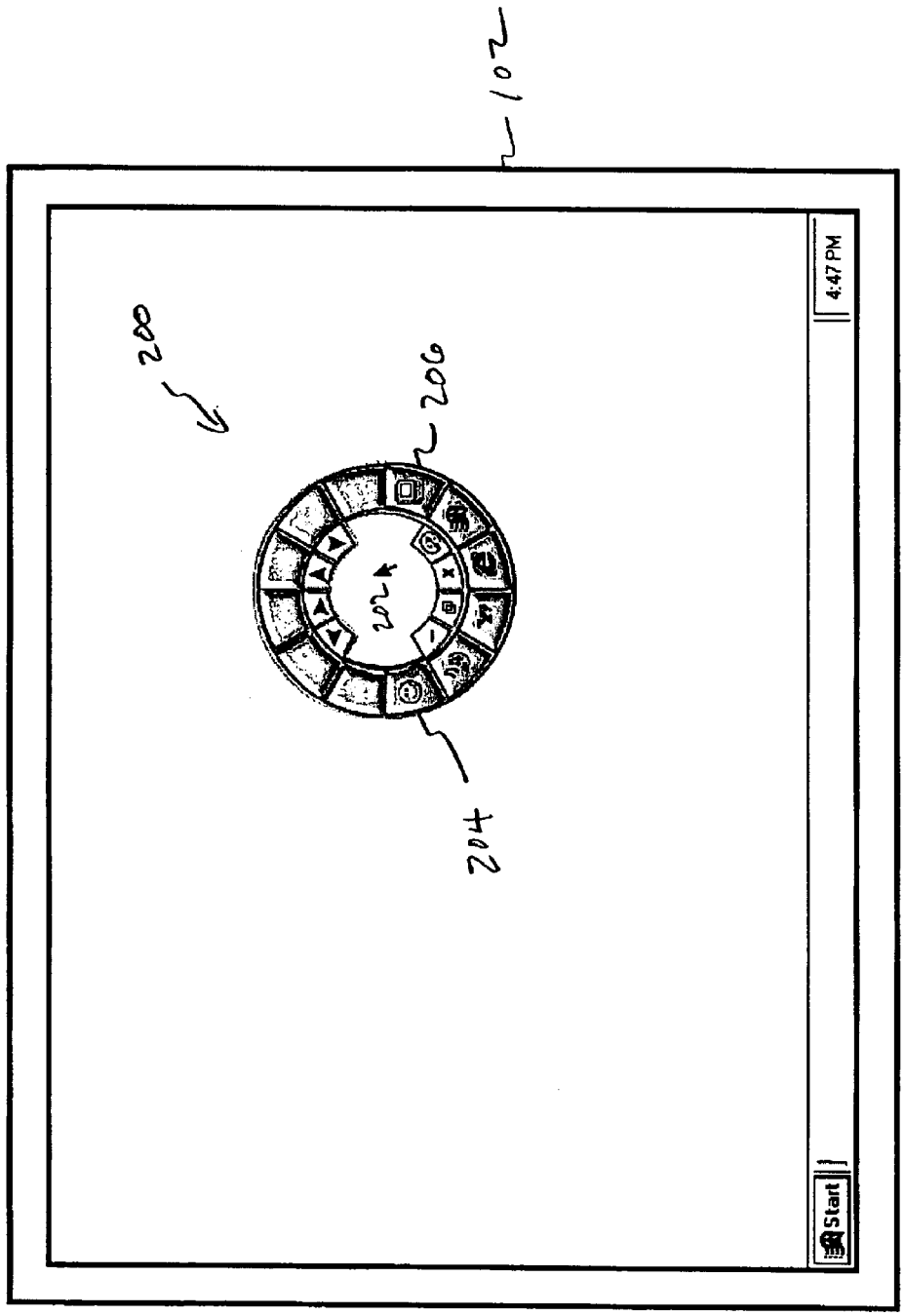
FIGS. 2A, 2B and 2C are screen grabs depicting a Zenu™ UDI, in accordance with the present invention.

FIG. 2A illustrates a Zenu™ 200, according to one embodiment of the present invention. In a cursor-based computing apparatus having a display 102, the Zenu™ 200 comprises a user definable interface (UDI) that is displayed upon activation by a user. The UDI has a plurality of buttons and is displayed in a relative position about the cursor position to substantially reduce cursor commute. The Zenu™ (UDI) 200 permits the user to select a visual appearance and shape of the UDI, as well as other characteristics, such as the number of buttons to be displayed and the commands associated with those buttons. Also, the Zenu™ 200 permits the user to assign commands to the buttons by dragging and dropping from one or more applications associated with (e.g., capable of running on, or otherwise coupled to) the apparatus.

In this embodiment, Zenu™ 200 can have multiple groups of buttons. The multiple groups of buttons can have different functionality. For example, as illustrated in FIG. 2A, a first group of buttons on the lower half of the Zenu™ 200 (buttons 204, 206 and those located on the outer circumference there between) can each have a first class of functionality. The second group of buttons (such as the remaining buttons on the outer circumference on the top portion of Zenu™ 200) can have a second class of functionality, the second class of functionality having some association with the first class of functionality. For example, the first class of functionality can cause icons to appear on other buttons, and the second class of functionality can cause some action associated with another button to occur.

Figure 2B:
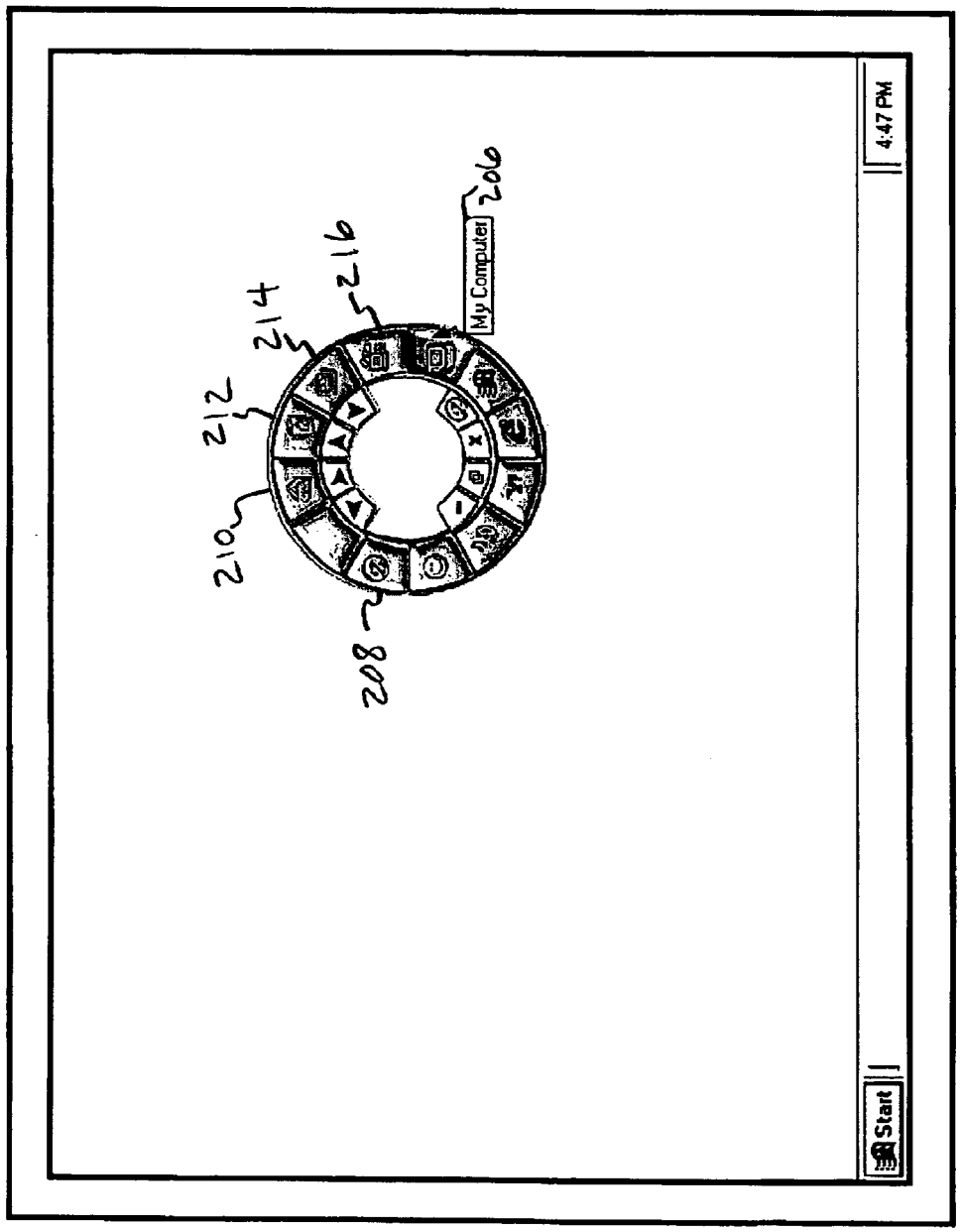

An example of the association between the first class of functionality of the first group of buttons and the second class of functionality of the second group of buttons is illustrated at FIG. 2B. By way of example, not limitation, reference is made to the "My computer" button 206. My computer button 206 is a button in the first group. When My computer button 206 is clicked or otherwise selected using a pointing device, software action causes icons to appear on the second group of buttons. In this example, buttons 208 through 216 of the second group of buttons display icons corresponding to options, commands, files, or the like, associated with My computer button 206 of the first group of buttons.

Figure 2C:
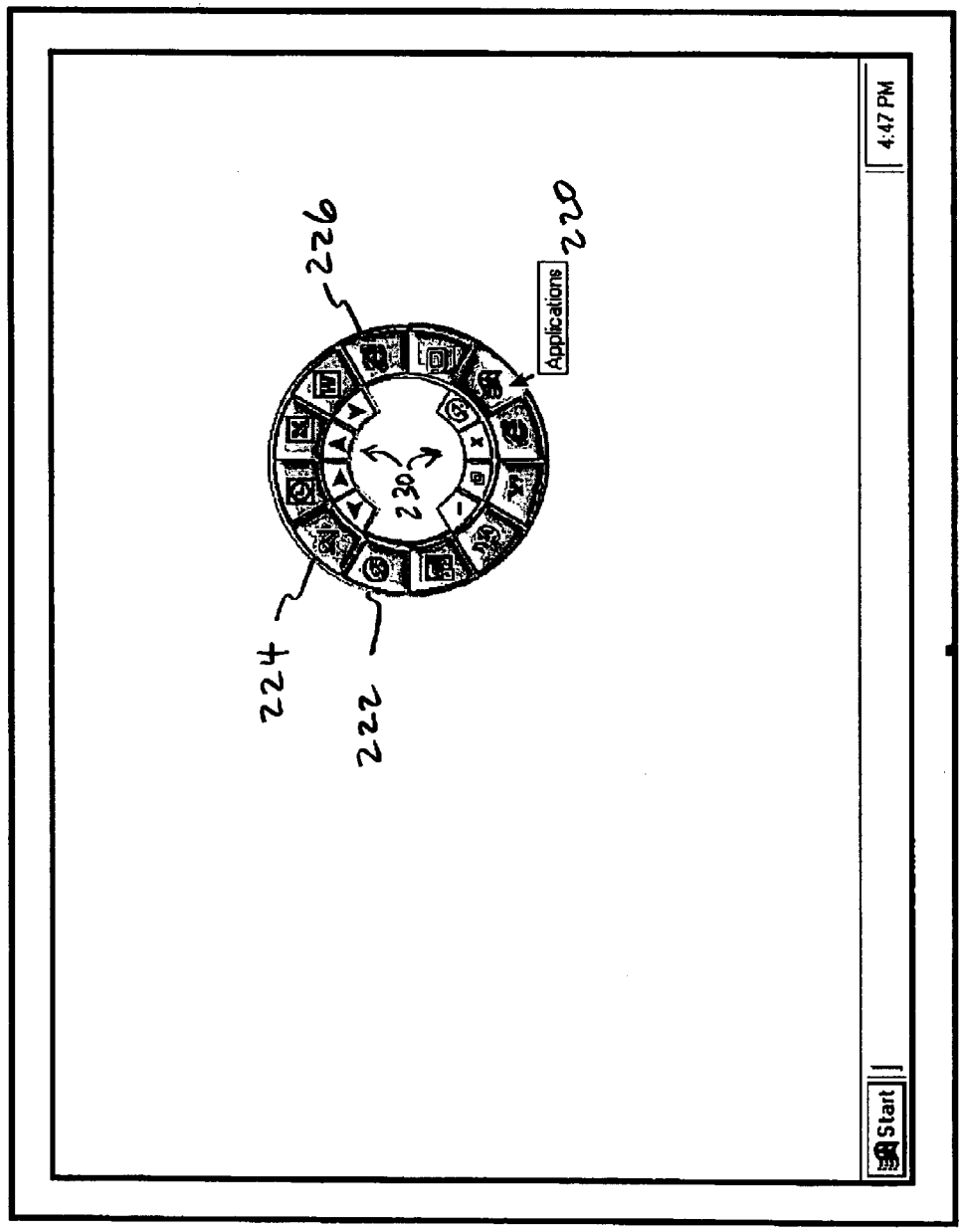

Similarly, as shown in FIG. 2C, when the user clicks or otherwise selects Internet browser button 220 of the first group of buttons, the second group of buttons will display features, commands, URLs, or the like, associated with the Internet browser button 220. Selecting the applications button 220 causes various icons corresponding to resident applications to be displayed on the second group of buttons, such as Zenu™ button 222, find button 224, Internet browser button 226, etc.

Zenu™ 200 can comprise additional groups of buttons as illustrated generally at 230. The commands associated with button groups 230 can comprise common cursor control operations as illustrated by the arrows at upper and lower groups 230, or the like.

Figure 3A:
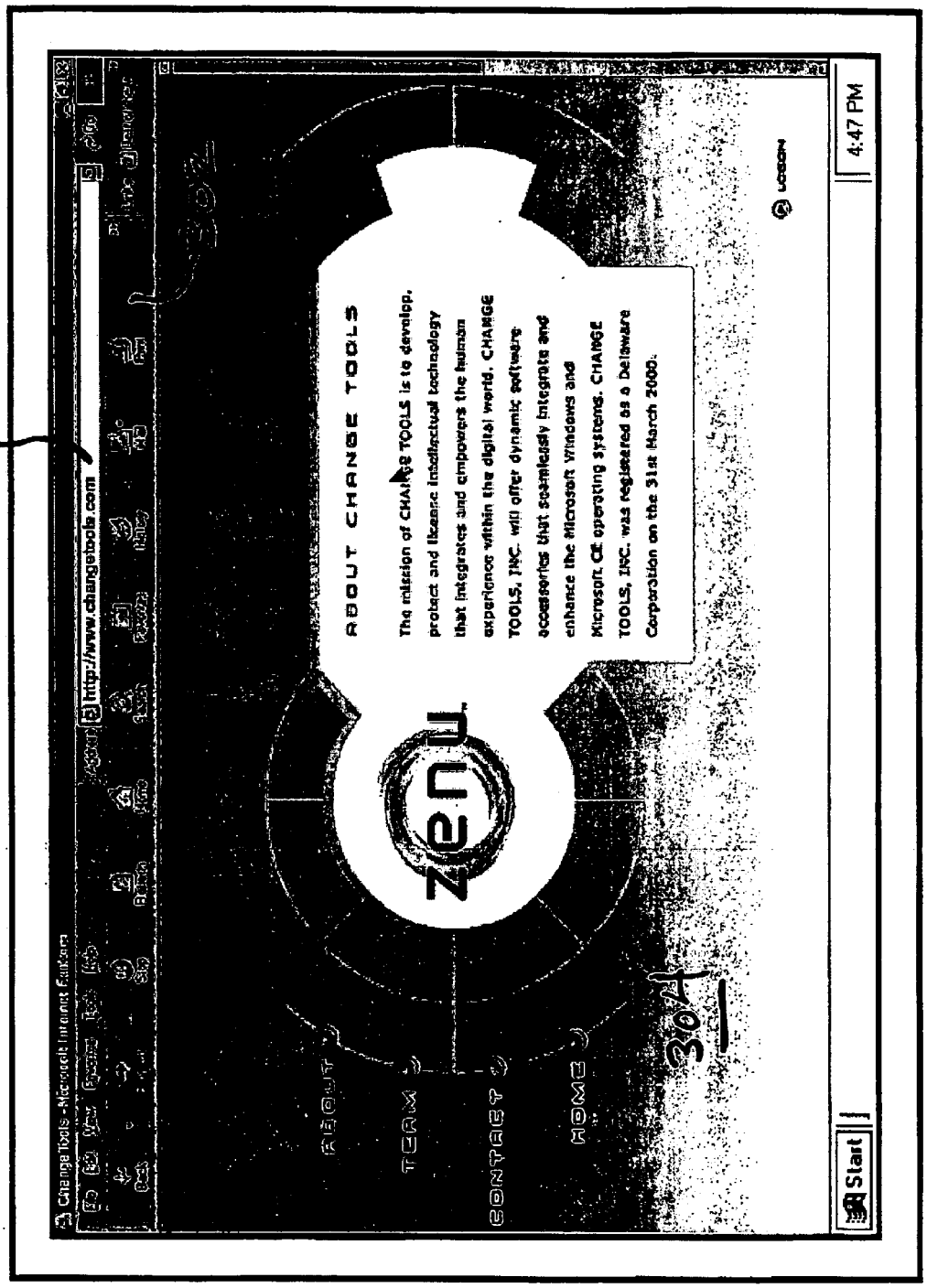
FIG. 3A illustrates a conventional toolbar accessing a web page.
Figure 3B:
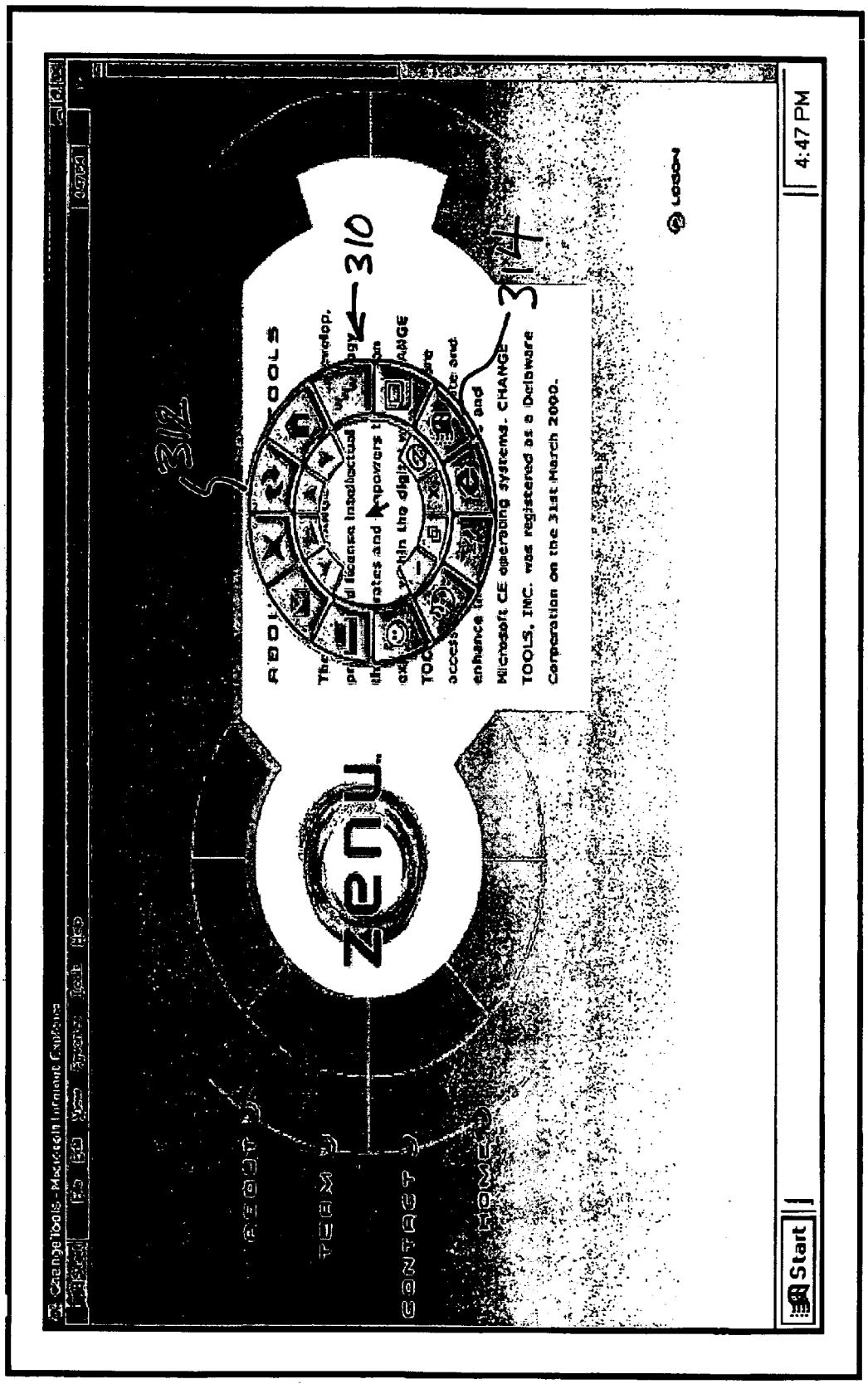
FIG. 3B illustrates a Zenu™ UDI accessing the web page of FIG. 3A, in accordance with the present invention.

FIG. 3A illustrates a conventional menu driven display, which in this case is a tool bar 302 of Microsoft® Internet Explorer. Illustrated in the main window is a web page 304 corresponding to the Internet address at 306. FIG. 3B illustrates Microsoft® Internet Explorer at the same web page after being launched by a previously invoked Zenu™ 310. The commands of tool bar 302 in FIG. 3A are illustrated in the upper button group of Zenu™ 310, as shown generally at 312.

Thus, according to the present invention, use of the Zenu™ 310 in this example simplifies the user's interaction with the Microsoft® Internet Explorer application by providing common Microsoft® Internet Explorer commands on the Zenu™ 310 for easy access by the user. Also, as will be described in detail below, the user can define the commands associated with the first group of buttons. For example, the web page displayed in FIG. 3B could be the home page associated with the Microsoft® Internet Explorer application. In this case, the user's selection of the icon 314 would bring up this web page. Further description of the functionality including the operation and definability of a Zenu™ UDI will be addressed in the next sections.

II. Functionality
  1. Title Operation
  1. What can the Zenu™ UDI Do?

Figure 4:
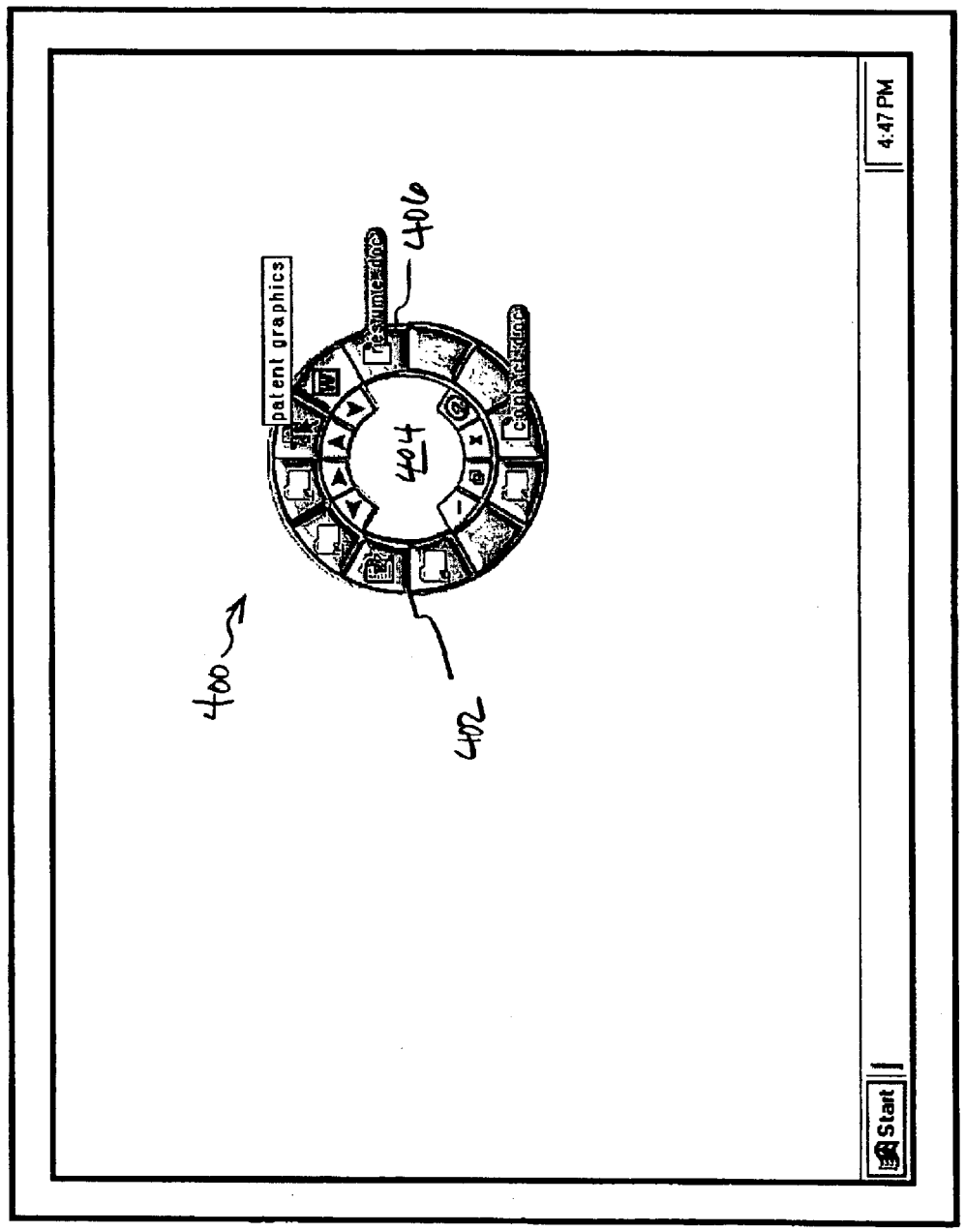
FIG. 4 illustrates a Zenu™ UDI corresponding to the present invention.

FIG. 4 illustrates user definable interface (UDI or Zenu™) 400 used to launch applications, files, or web pages, or the like, according to an embodiment of the present invention.

Figure 5:
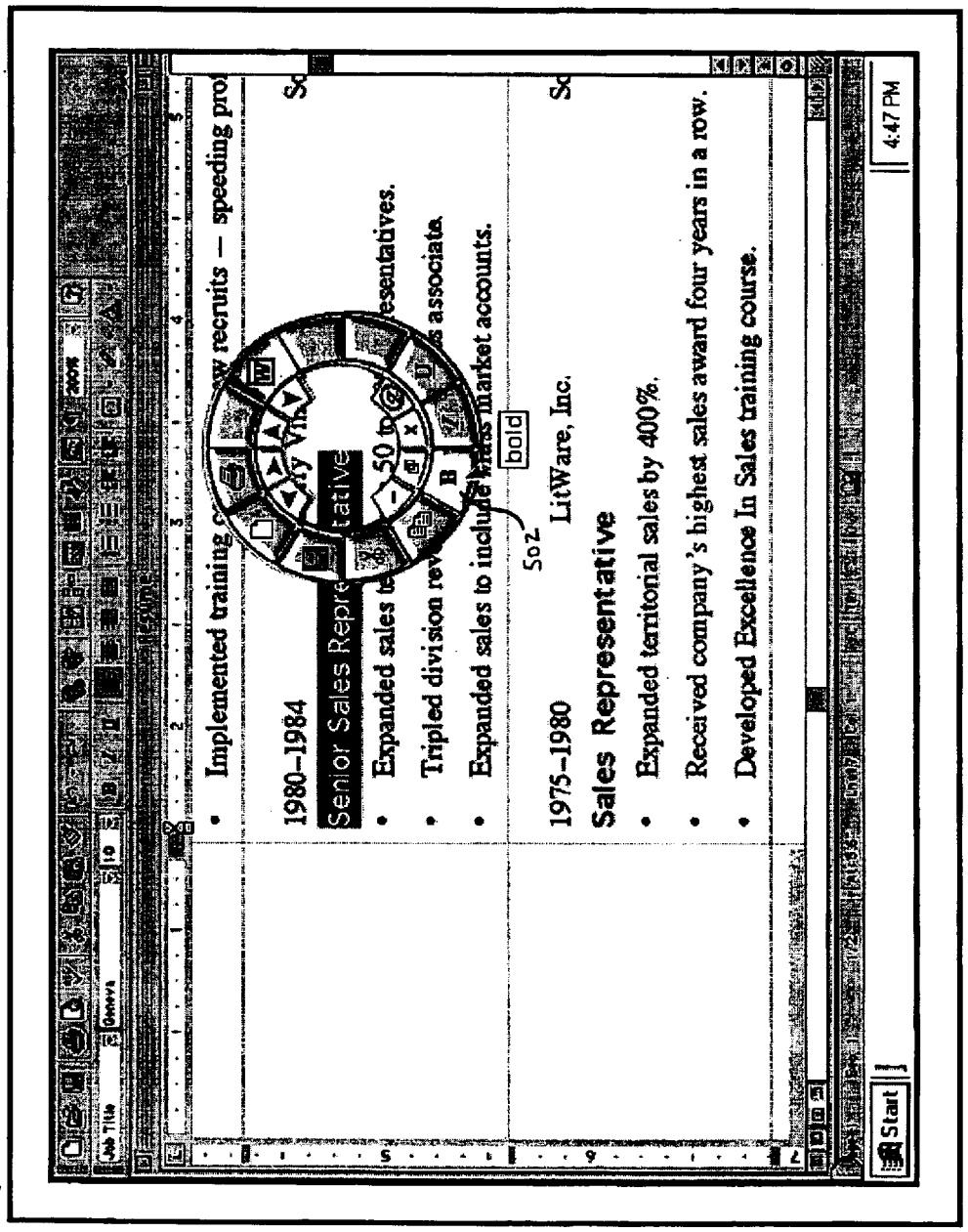
FIG. 5 illustrates the opening of a file with the Zenu™ UDI of FIG. 4, in accordance with the present invention.

In this embodiment, Zenu™ 400 is in the form of a ring 402 having a group of buttons along its outer circumference and an open central section 404. Selected buttons have been associated with various software applications, files, folders, and the like. The illustration of such software applications, files and folders in the context of a personal computer or laptop is provided by way of example, not limitation. The present invention can be implemented with any apparatus having a display device for user interaction with the device. In this example, selection of the resume button 406 opens the file "resume.doc" and launches the associated software application (Microsoft® Word in this example), assuming that the application was not currently running. FIG. 5 shows the opened file and an associated application. Alternatively, the Zenu™ 400 can be modified by the user to launch various software applications. As would become apparent to a person skilled in the relevant art, the launching of software applications, opening of files, or accessing web sites are only examples of the type of launching that can be done from a Zenu™ UDI. The present invention should not be limited to such examples.

According to the present invention the Zenu™ UDI also functions as a controller. For example, after opening of the file 406, the appearance and command functionality of the buttons on ring 402 of Zenu™ 400 change, as illustrated in FIG. 5. Zenu™ 400's buttons now correspond to different commands than those of Zenu™ 400. Upon opening of the resume.doc file, the commands associated with Zenu™ UDI automatically switch to commands that correspond to various Microsoft® Word menu choices/actions. See, for example, "bold" action 502.

The Zenu™ UDI can have default commands associated with the various software applications, such as Microsoft® Word, or any other software application or control system capable of being controlled by a display device. Alternatively, the Zenu™ UDI can be modified by the user to launch various software applications. As would become apparent to a person skilled in the relevant art, the control of software applications, control systems or other apparatus coupled to a display device are only examples of the type of control functionality that can be performed by a Zenu™ UDI. The present invention should not be limited to such examples.

Figure 6:
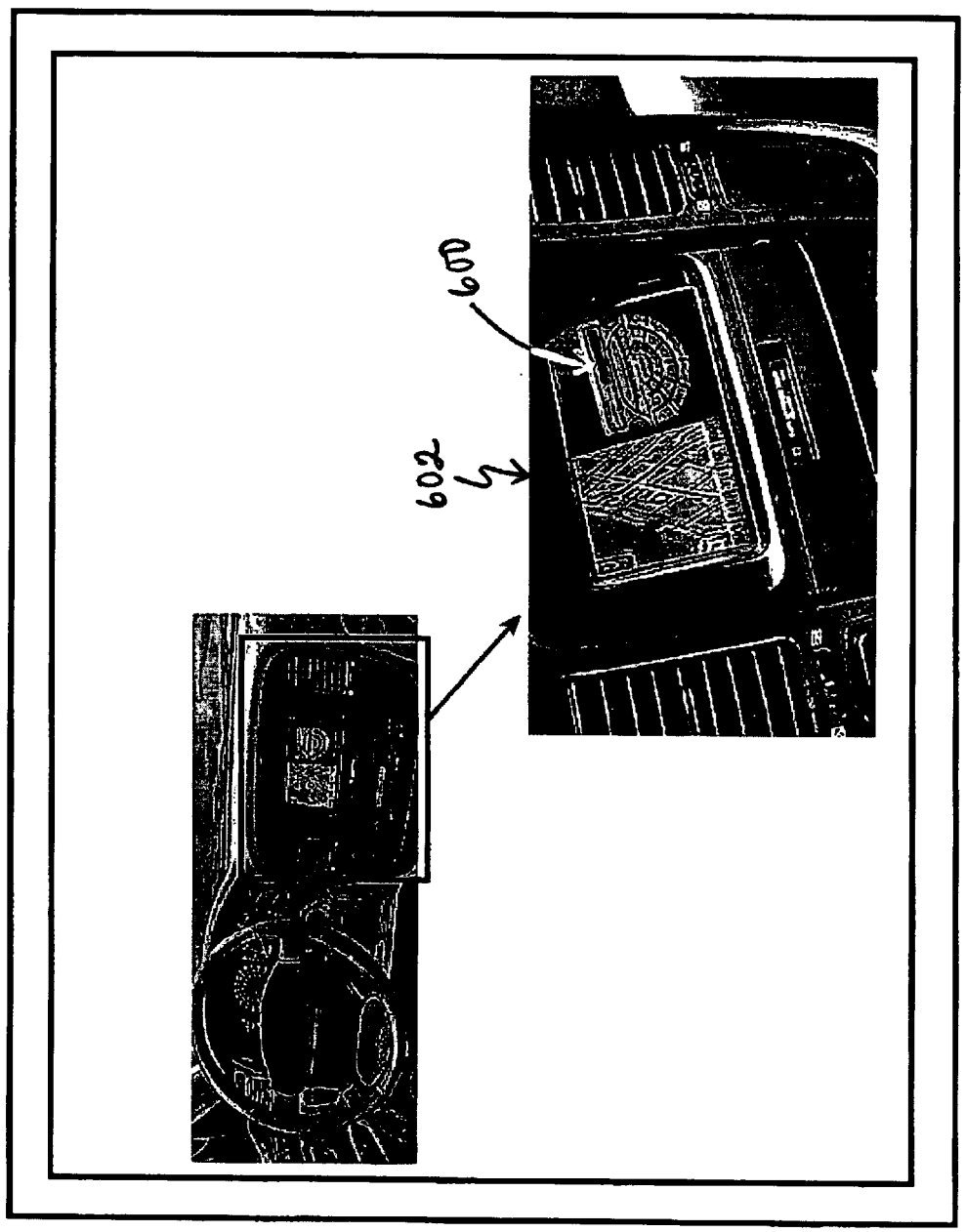
FIG. 6 illustrates an alternative control capability of a Zenu™ UDI, in accordance with the present invention.

Such alternative control capability of a Zenu™ UDI is illustrated in FIG. 6. In this figure, a Zenu™ 600 is visible on an automobile dashboard display device 602. The pointer device can be buttons integrated on the steering wheel, rotary dials and buttons on the dashboard, a touch screen on the display itself, a voice input system, and combinations thereof, as would become apparent to a person skilled in the relevant art.

A major advantage of such Zenu™ UDI integration is commonality. Once users become accustomed to the Zenu™ UDI's appearance, operation and definability, their efficiency in using new devices incorporating a Zenu™ UDI will dramatically improve. Many consumers complain that "I can't even program the clock on my VCR, yet alone my . . . " This unwillingness and frustration of the general public to program consumer electronic devices, controllers, appliances, and the like can be redressed by integration of the Zenu™ UDI into a wide variety of devices. Thus, in other applications, the Zenu™ UDI can be integrated with hand-held controllers, such a remote controls for televisions, video equipment, home entertainment systems, cameras, household, including wireless telephones, copiers, as wells as commercial appliances and tools, and the like, as would become apparent to a person skilled in the relevant art.

A further use of the Zenu™ UDI is as a container. FIG. 7 illustrated a Zenu™ 700 configured with an instant messaging plug-in. In this example, a container 702 is appended to the top of the Zenu™ 700 upon selection of the instant messaging plug-in button 704. This button 704 can be a button on the outer button ring 706 or elsewhere on the Zenu™ 700. Once the container 702 is displayed, the upper buttons of the Zenu™ 700 are automatically flipped to form an outer bottom hemisphere ring (hemi-ring) 708. Also, upper inner ring buttons (shown generally at 710) are re-located to the bottom inner ring automatically. Various controls for the container 702 can be located at region 712, or along top 714 or sides 716, 718 of the container 702.

Alternative types of Zenu™ UDI containers include, but are not limited to tickers, video clip viewing, image viewing, quick file viewing, or the like, as would become apparent to a person skilled in the relevant art.

2. What can the Zenu™ UDI Look Like?

Figure 8A:
Figure 8B:
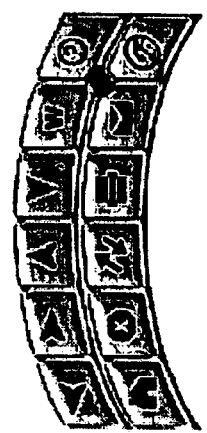
Figure 8C:
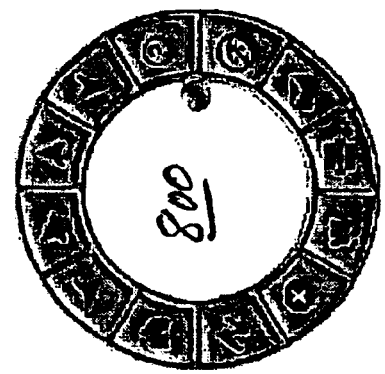

The user definable characteristics of a Zenu™ UDI are extensive. A main definable characteristic of a Zenu™ UDI is its shape. FIGS. 8A–F are illustrate six exemplary Zenu™ UDIs. These example are presented by way of example and not limitation. FIG. 8A illustrates a rectangular Zenu™ UDI comprising rows and columns of Zenu™ buttons. FIG. 8B illustrates a Zenu™ UDI similar to FIG. 8A, but the rows have an arch appearance. FIG. 8C illustrates a ring shaped Zenu™ UDI, with a central transparent window 800 and the same Zenu™ buttons of FIGS. 8A and 8B connected in a contiguous manner. Alternatively, a ring shaped Zenu™ UDI can have round buttons arranged in a noncontiguous manner, as illustrated in FIG. 8F.

Figure 8D:
Figure 8E:
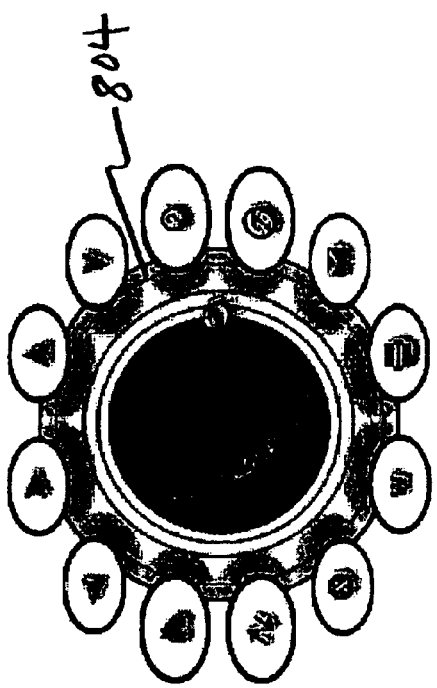
Figure 8F:
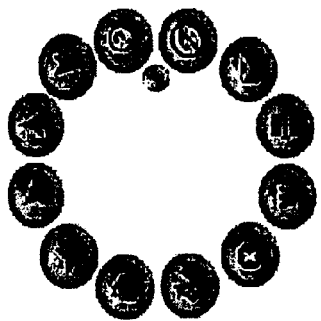

Two more stylized Zenu™ UDIs are shown in FIGS. 8D and E. In FIG. 8D, the Zenu™ UDI is in a rectangle, but in contrast to FIG. 8A, the Zenu™ buttons enclose a central rectangular area 802. Central rectangular area can comprise an advertisement, corporate brand, customizable text or images, or the like, or it can be transparent like area 800. Alternatively, the central section may comprise a Zenu™ container as described above in connection with FIG. 7. A further stylized Zenu™ UDI is shown in FIG. 8E. Here noncontiguous Zenu™ buttons surround a central circular portion similar to the enclosed area 802 of FIG. 8D. An inner 804 border is also included.

B. Definability

1. Defining Zenu™ UDI Look

Another aspect of the present invention is the ability of users to readily modify the appearance of the Zenu™ UDI. According to this aspect of the present invention, the user's ability to define the appearance of the Zenu™ UDI is hereafter referred to as providing an "interactive skin" for the Zenu™ UDI. FIG. 9A illustrates a Zenu™ 900 and a interactive skin control panel 902, which is accessed by the user selecting Zenu™ customization button 904. The interactive skin control panel 902 presents to the user a plurality of predetermined Zenu™ interactive skins (shown generally at 906), and a separate Zenu™ 908 for interacting with the interactive skin control panel 902. Interactive skin control panel 902 permits the user to select an interactive skin of the Zenu™ UDI according to various possibilities as described above in connection with FIGS. 8A–8F, for example.

The user's ability to define the appearance of the Zenu™ UDI using the interactive skin control panel 902 to select an interactive skins is not limited to selecting the shape and arrangement of buttons, as described above in connection with FIGS. 8A–F. Various Zenu™ interactive skin attributes can be modified, including, but not limited to color, shading, texture mapping, animation, scaling, and various other computer graphic affects, as would be apparent to a person skilled in relevant art.

The interactive skin control panel 902 illustrated in FIG. 9A is an example of a novice user control panel. FIG. 9B illustrates an alternative to the Zenu™ UDI and a interactive skin control panel of FIG. 9A, in accordance with the present invention. Examples of advanced user control panels are illustrated in FIGS. 10A and 10B.

2. Defining Zenu™ UDI Functionality

In addition to permitting the user to define an interactive skin for a Zenu™ UDI, according to another embodiment of the present invention, users can also define the functionality of the Zenu™ UDI. FIG. 10A illustrates a Zenu™ 1000 and a Zenu™ UDI functionality control panel 1002. The Zenu™ UDI functionality control panel 1002 is also accessible via the Zenu™ customization button 904. The Zenu™ functionality control panel 1002 represents an advanced user control panel.

Various software application commands can be assigned using the "plugins" 1004 and 1006. The currently available applications are listed in window 1004 and their associated commands are listed in window 1006. "Glossary Commands" are available to the user in a window 1008. New glossary commands can be added via a button 1010, and/or edited via a button 1012. Button resets are available via button 1014. Selection of an available theme, as described in detail below, can be applied via a pull-down menu 1016. Alternatively, a program to be started upon clicking the button being defined can be selected by a "Browse" button 1018. The new command string for the button being defined is displayed in a window 1020. Conventional control panel buttons "OK", "Cancel" and "Apply to Button" (1022, 1024 and 1026, respectively) are also provided.

In this figure, the Zenu™ functionality control panel 1002 illustrates the functionality of a exemplary button 1003 (as shown at the top of the Zenu™ functionality control panel 1002). Button 1003 is "Square," and its current command is associated with the Internet Explorer "Refresh" action. Button 1003's command string is listed in window 1020. The Refresh icon (two opposing arrows) is shown on the Zenu™ 1000.

A "ToolTip per Theme" option permits the user to assign, via a pull-down menu, text that is to be displayed when the cursor floats over a button. The ToolTip text explains the command to be performed, such as "My Computer" when the cursor passes over button 206, as shown in FIG. 2B.

FIG. 10B illustrates a Zenu™ 1050 and Zenu™ properties control panel 1052, which permits the user to define various "Startup Options" 1054. Alternatively, the user can select to "Reset Overrides" by selecting tab 1056 (the Startup Options 1054 occults the Reset Overrides options in the figure).

3. Disabilities Act Compliance

In 1998, Congress amended the Rehabilitation Act to require Federal agencies to make their electronic and information technology accessible to people with disabilities. Inaccessible technology interferes with an individual's ability to obtain and use information quickly and easily. Section 508 of the Rehabilitation Act of 1973, as amended (29 U.S.C. 794d), was enacted to eliminate barriers in information technology, to make available new opportunities for people with disabilities, and to encourage development of technologies that will help achieve these goals. The law applies to all Federal agencies when they develop, procure, maintain, or use electronic and information technology. Under Section 508, agencies must give disabled employees and members of the public access to information that is comparable to the access available to others.

According to another embodiment, the Zenu™ UDI of the present invention can be adopted for the following, non-exhaustive list of Technical Standards of Subpart B, Section 508: 1194.21 Software applications and operating systems; 1194.22 Web-based intranet and internet information and applications; 1194.23 Telecommunications products; 1194.24 Video and multimedia products; 1194.25 Self contained, closed products; and 1194.26 Desktop and portable computers. Those skill in the art will readily envision other similar applications for the Zenu™ UDI of the present invention.

III. Exemplary Architecture

A. Interactive Skin

This section describes an exemplary architecture for implementing a Zenu™ UDI having a plurality of command regions. Command regions correspond to the various Zenu™ buttons described above, for example. According to an embodiment of the present invention, FIG. 11 depicts an exemplary architecture 1100 having a command processor 1104 that manages an interactive skin (IS)1106. IS 1106 comprises a template 1108 and a theme 1110. The template 1108 defines position information for the plurality of command regions corresponding to the UDI (not shown). Template 1108 also defines default attributes 1112 or default commands 1114 for the plurality of command regions. The theme 1110 defines (1) attributes 1116 if the template 1108 only defines default commands 1114 for the plurality of command regions, and/or (2) commands 1118 if the template 1108 only defines default attributes 1112 for the plurality of command regions. A customizer 1120 is provided to permit the user to replace or extend any of the default attributes 1112 or the default commands 1114 of any of the plurality of command regions.

B. Exemplary Architecture Syntax

This section describes the various syntactical expressions used to create the UDI interface and the functionality applied to certain click areas, whether they appear as buttons or just a portion of an image. These settings are stored in a Template file (.tpl), and a Theme file (.thm) located in the subdirectories "Template" and "Theme" respectively, for example. Settings can also be stored in a text initialization file (.ini).

Order of precedence dictates which settings are used. Settings that originate in the Template file can be replaced by settings in a Theme file, and the resulting settings can further be replaced by user/application-defined settings in the initialization (i.e., customization) file.

For the purpose of this document, action areas will be called "buttons" although they can appear as any bitmap that is specified in the resource file, thereby making it possible for a button to take most any shape or look that is possible using combinations of background bitmaps, and button bitmaps.

1. Settings

The currently available settings for UDI buttons or action/click areas are defined as follows in Table 1:

TABLE 1

| | |
|---|---|
| A | Indicates that this area is available to be morphed into a Quicklaunch or Internet Favorites button. |
| Transparent | Indicates whether there is a transparency color in the bitmap that is to be used for the button. |
| Bitmap | The Name of the Bitmap resource that is to be used for the button. |
| BtnType | The number of states that the bitmap has, for instance: normal, pressed, flyover, and disabled. |

TABLE 1-continued

| | |
|---|---|
| Tooltip | The tool tip to display when a user hovers the mouse cursor over the button. *Note, when in a template or theme file there is no need for a theme specific indication because that particular file is already theme specific. However, in the initialization file, tool tips must be associated with specific themes because the .ini file itself is not theme specific. |
| Tweak | Provides a means of adjusting button locations more accurately than a dialog resource allows. |
| AutoRepeat | Indicates whether a button repeats the "click" command if a user holds the left mouse down while clicking. An example might be a button that is used for scrolling. |
| Checkbutton | Indicates whether the button stays in the pressed position until another button on the window is pressed. |
| Icon | Specifies the name of the Icon (or bitmap) located in the resource file to be used with a button. |
| IconType | Indicates whether the name specified by "Icon" was a bitmap or Icon. |
| Template | Indicates opening the specified window named. |
| Theme | If the window specified by "Template" is found, this setting will make the window apply the theme specified. |

2. Settings Syntax

Acceptable Values are listed below in Table 2:

TABLE 2

| | |
|---|---|
| A | "QL" for Quicklaunch or "BM" for Internet Favorites Book mark |
| Transparent | True or False |
| Bitmap | The name of the bitmap in the resource file. |
| BtnType | A number between 1 and 4 |
| Tooltip | Text |
| Tweak | X,Y with both values being an integer number |
| AutoRepeat | True or False |
| CheckButton | True or False |
| Icon | Name of an Icon or Bitmap located in resource file |
| IconType | "Bitmap" or "Icon" |
| Template | The text name of a Template. |
| Theme | The text name of a Theme to apply to the window. |

*There should not be any spaces in the text, except when a name has a space in it, for instance "Bitmap=Cat Eye;" where the bitmap is named "Cat Eye".

The follow is an examples string using proper syntax:

BtnType=3;Bitmap=TWO;Transparent=FALSE;Template=zenu;Theme=MyComputer;.

Where: BtnType indicates the button has 3 states—normal, pressed, and flyover. Bitmap specifies that there is a bitmap in the resource file with the name of "TWO" that is to be applied to this button. "Transparent=False;" states that there is no transparency color in the bitmap. The "Template=zenu; Theme=MyComputer;" indicates that when the button is clicked, the main window named "Zenu™" will change its theme to the "MyComputer" theme.

3. Button Command Syntax

Each command entered for a button to process upon clicking, must be separated with a semi-colon, for instance:

CMD:http://www.cuspis.com;c:\winnt\system32\calc.exe;.

The "CMD:" shown above is a keyword specifying that this command is not from a plugin. If the use wishes to process a plugin command, the "PLUGIN:" keyword would have to precede the command itself, for instance:

PLUGIN:word.bold;.

If the user wants to process commands from both plugins and non-plugin commands, the keyword "CMD:" or "PLUGIN:" must precede the command in the text. In addition to the "CMD:", the user can also specify a double-click action by using the keyword "CMDDBL:".

For Instance:

CMDDBL:"Template=zenu;Theme=Quicklaunch; Icon=QUICKLAUNCH;IconType=Icon;Tooltip=Quicklaunch";

Another example is as follows:

CMD:http://www.cuspis.com;c:\winnt\system32\calc.exe;PLUGIN:word.bold;.

In response to the text of this second example, the program will open (if not open already) the web browser, and navigate to http://www.cuspis.com, next it will open the calculator program (if the path to the file is correct), and if MS word is open, will process the plugin command word-.bold.

4. Theme Specific Commands

A user can specify commands that are only activated while using a specific theme. For instance, if the user wanted a button to open the calculator program when using a theme called "Math", but wanted this button to open http://www.amazon.com any other time, the user could write the following command:

AllOther=CMD:http://www.amazon.com; Math=CMD:C:\winnt\system32\calc.exe;.

In the above sample command, if the theme called "Math" was the current theme, the calculator program will open, otherwise for all other themes, this button will open the browser to amazon.com.

The following is yet another sample command:

Math=CMD:c:\winnt\system32\calc.exe;Favorites=http://www.msn.com;.

By using of a theme called "Retro", and the user then click the button with the command above, the Zenu™ UDI will not use either command. Instead, the Zenu™ UDI will look for the default command for the button in the template resource file.

5. Click and Drag

Users can click and drag shortcuts from the Windows desktop or Windows Explorer to a Zenu™ button of the present invention. This will cause the button to have the same action as the shortcut. If a file that is not a shortcut is dragged from Windows Explorer to a Zenu™ button, the Zenu™ UDI will make the button a shortcut pointing to the file that was dragged. For instance, if the user drags a Microsoft® Word or notepad document onto a Zenu™ button, clicking that Zenu™ button will now open the document that was dragged onto the button. This overrides the default action of the button defined in the template or theme file as well as user-defined commands.

6. Hot Key

A "Hot Key" can be assigned by the user to show/hide the Zenu™ UDI.

For example, a specific, default set of key strokes, say Alt+F10, can be used. The user can readily change the default Hot Key, by right clicking anywhere on the UDI, and accessing "customize" and then the "Hot Key" feature. Next, all the user needs to do is press the desired key combination for the Hit Key, and it will be recorded in the text box of the Hot Key window. When the user is finished selecting the desired Hot Key, the user simply clicks "OK". This will change the Hot Key, and store it so that the next time Zenu™ UDI is executed, it will use the same Hot Key combination to show/hide.

D. Sizing of the Zenu™ UDI

The Zenu™ customizer of the present invention also permits the user to change the size of the Zenu™ UDI (i.e., the space occupied on the screen by the Zenu™ UDI). Sizing can be an integral component of the tool, permitting the user to scale (stretch or shrink) the Zenu™ UDI to match the desired size. Sizing could be arbitrary, as in permitting the user click on an edge or "handle" and changed the size of the Zenu™ UDI. In a preferred embodiment, however, the user would be presented with a finite number of size option, say three sizes: smaller, normal, and larger. This allows exact scaling of the Zenu™ UDI to eliminate distortion and to maintain its aspect ratio. In another embodiment, up to ten different sizes are available including "full screen", which becomes an attractive option when the Zenu™ UDI acts as the container for chat, video, browsing, mail, and the like.

The template and the theme can be designed to include knowledge of the multiple sizes available. Alternatively, all that is required is the "Normal" set of templates and theme components. As the user selects to change the size, the template/theme combination is scanned for prior-knowledge of possible sizes. The customizer can presents user with the additional choice(s). Once a new size is chosen, imagery designed specifically for the different size is used. In the event that an image is not provided or available at the different size, the normal image is scaled to match the destination, as would become apparent to a person skilled in the art of developing window-based applications. Sizing of the Zenu™ UDI provides greater flexibility when implemented with the templates and themes. The system that allows the designers to choose whether they desired to re-use a simple graphic at multiple resolutions, or to duplicate an image for different resolutions increasing or decreasing the amount of detail included in the image. This is similar to conventional icon on the desktop; an icon (.ico) can contain up to four different images, two each in black and white and color at 16×16 and 32×32 pixels.

E. Exemplary Architecture Operation

FIGS. 12 through 19 are flow diagrams illustrating the operation of an exemplary Zenu™ UDI system and method according to an embodiment of the present invention. For ease of explaining this example, the Zenu™ UDI comprises an application executing on a personal computer in a Microsoft® Windows environment. The Zenu™ UDI from a file resident in the computer system, such as in a fixed drive or other memory medium.

Figure 12:
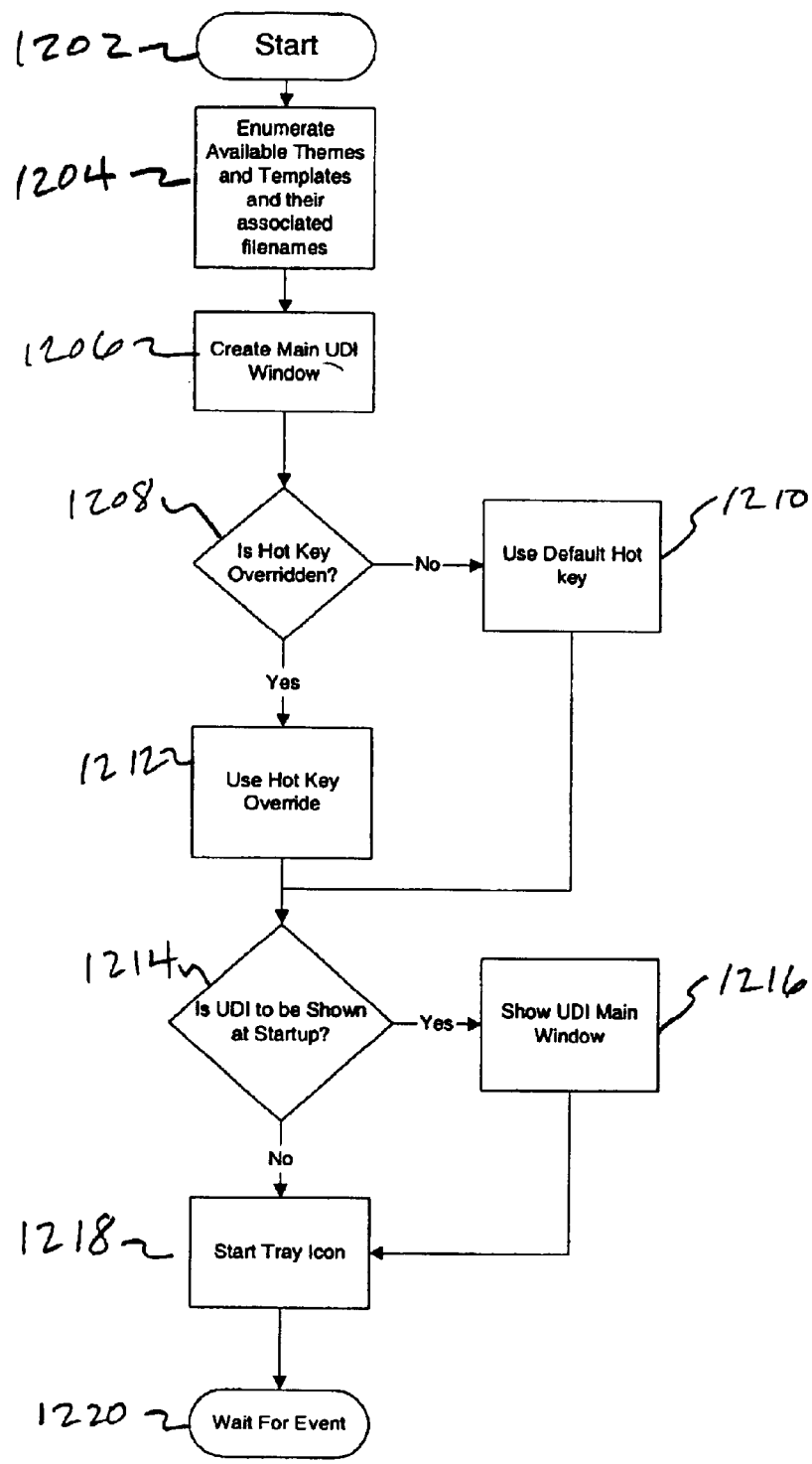

Turning to FIG. 12, a step 1202 represents launching of the Zenu™ UDI. Thus, once launched in this manner, the Zenu™ UDI is loaded in the computer's random access memory (RAM) and either appears as an icon in the Window's system tray, or is displayed for the first time. At a step 1204 available themes and templates are enumerated according to their associated file names so as to create a main UDI window, as shown at a step 1206. As part of the launching process, a decision is made at a step 1208 as to whether a default Hot Key has been overridden. If not, a default Hot Key is assumed as shown at a Step 1210. If the default Hot Key was overridden, the system will use the Hot Key override as shown at a step 1212. Next, at a decision step 1214, it is determined whether the UDI is to be shown at startup. If YES, the UDI is displayed, as shown generally at a step 1216. Otherwise, the UDI is started and placed in the Window's system tray as an icon, as shown at a step 1218. The system then waits for an event, shown generally at a step 1220.

Figure 13:
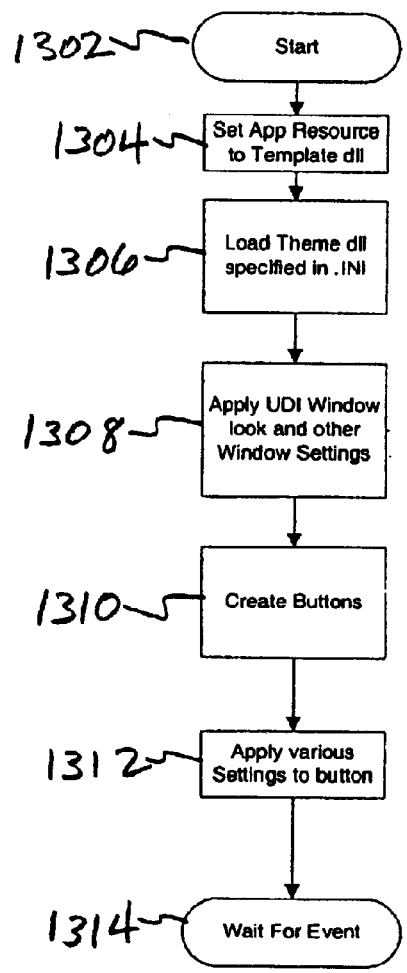

FIG. 13 is a flow diagram representing further details of step 1206 (create main UDI window) of FIG. 12. FIG. 13 illustrates how the Zenu™ UDI obtains its appearance and what it does in order to render such appearance using system windows from Microsoft® Windows. Creating basic windows for the UDI begins at a start step 1302. Then a set of application resources are passed to a Template .dll, as a step 1304. The Template .dll comprises the resources within the UDI that gives the Zenu™ UDI its shape and controls position of the buttons. At a next step 1306, a Theme .dll is loaded, as specified in an .ini file, or the like. The load Theme .dll stores all of the individual overrides of the Template in terms of its default appearance. At a next step, 1308, the relevant "UDI window look" is applied, together with other window settings. The details of step 1308 are described below in connection with FIG. 14. Next, at a step 1310, the buttons of the Zenu™ UDI are created as basic window definitions. The details of button creation are described below in connection with FIG. 15. Various settings of the buttons are then applied at a step 1312. The details of the button settings are described below in connection with FIG. 16. At a next step, 1314, the Zenu™ UDI waits for an event to occur. At this stage two events can occur; a button can be clicked, or a drop file unbutton event can occur. A "button click" is described below in connection with FIGS. 17 and 18. A "drop file unbutton event" is described below in connection with FIG. 19.

Figure 14:
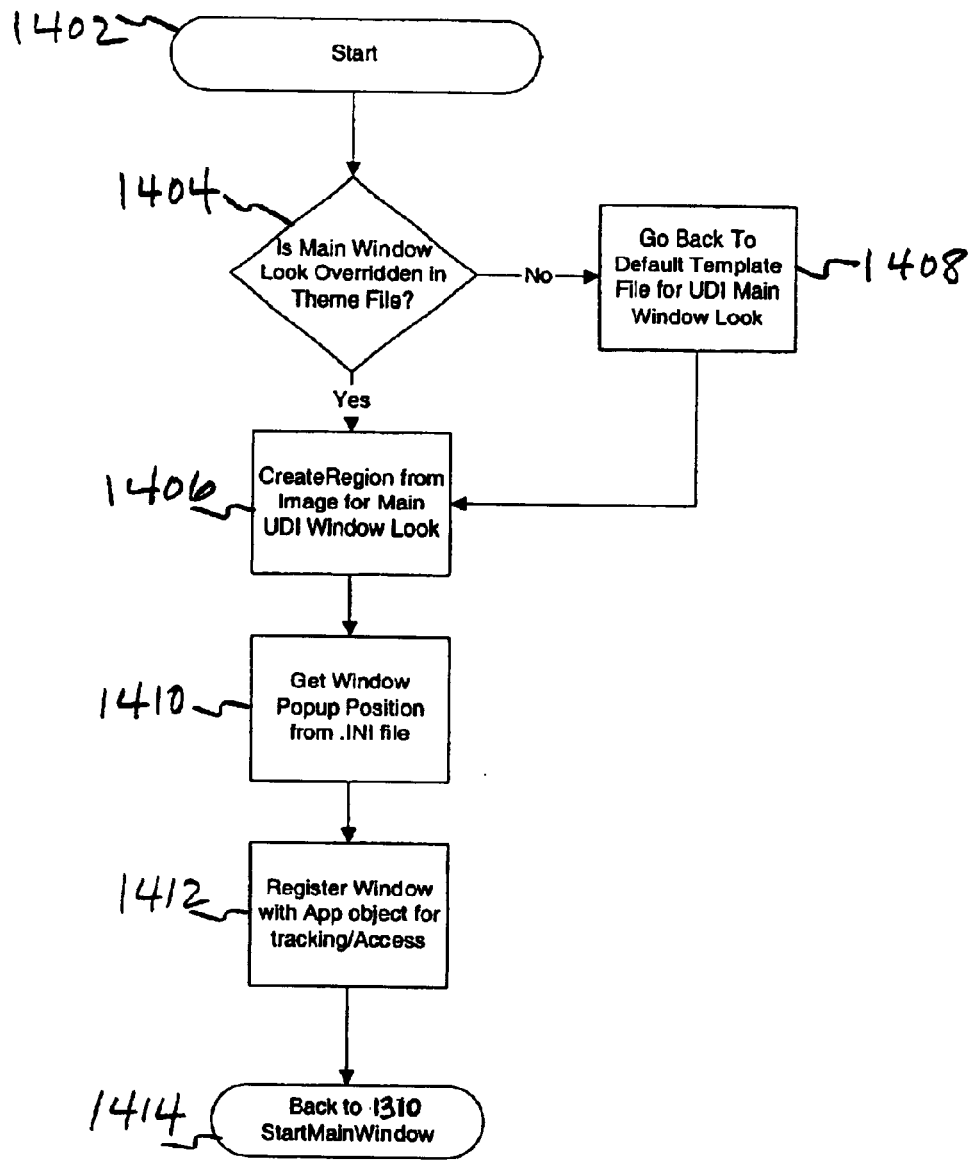

FIG. 14 describes the details of a plain UDI window look and other window settings as introduced at step 1308. This process starts at a step 1402. Based on the availability of the template and theme information, a decision is made (step 1404) to determine if the "main window look" is overridden in the theme file. If YES (i.e., the theme is going to be used), a region is created according to a "main UDI window look" in the theme, as shown at a step 1406. Otherwise, information from the default template will be used to create the region, as shown at step 1408. Next, at a step 1410, the window pop-up position information is retrieved from the .ini file. In other words, the position where the Zenu™ UDI was last displayed is obtained, or a cursor relative position is determined. At a step 1412 the window is then registered as an application object with a operating system for tracking and access purposes. Thus, the operation is performed and the flow FIG. of 14 represents a "shell" of the window for the Zenu™ UDI. Next, at a step 1414, the process flows to step 1310, which is further described in connection with FIG. 15.

Figure 15:
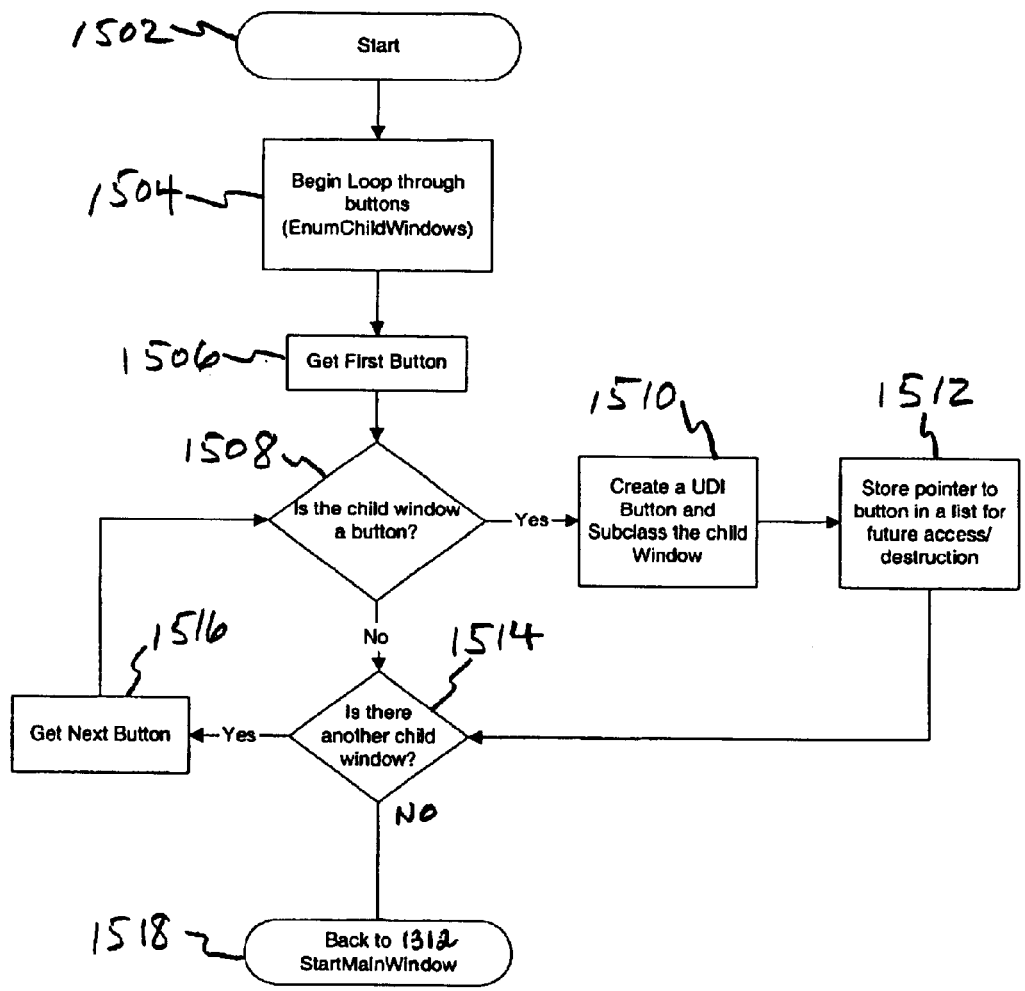

FIG. 15 illustrates the flow in connection with "creating buttons" as introduced at step 1310. The flow begins at a start step 1502. Steps 1504 through 1518 access the template to determine the designated number of buttons that make up the Zenu™ UDI. For example, the Zenu™ UDI of FIG. 8A comprises 12 buttons; two rows of 6 buttons each. In essence, this figure represents the creation of a small window corresponding to each button and links them together to create a Zenu™ shell. Every time a new Zenu™ UDI session is initialized, i.e., the Zenu™ UDI is launched, small windows called "child windows" corresponding to each button of the Zenu™ UDI must be created to form the UDI, as shown at a step 1504. A first button is processed as shown at a step 1506. At a step 1508, it is then determined whether the child window is a button. If YES, a UDI button is created and it is assigned a subclass as a child window, at a step 1510. Next, a pointer to the button is stored in a list for future access, as shown at a step 1512. If an additional child window is to be processed, as determined at a step 1514, the next button is retrieved, as shown at a step 1516. The process then flows back to step 1508, otherwise the flow proceeds to step 1312 as shown by step 1518. Step 1312 applies various settings to each button just created, the details of which are described in connection with FIG. 16.

Figure 16:
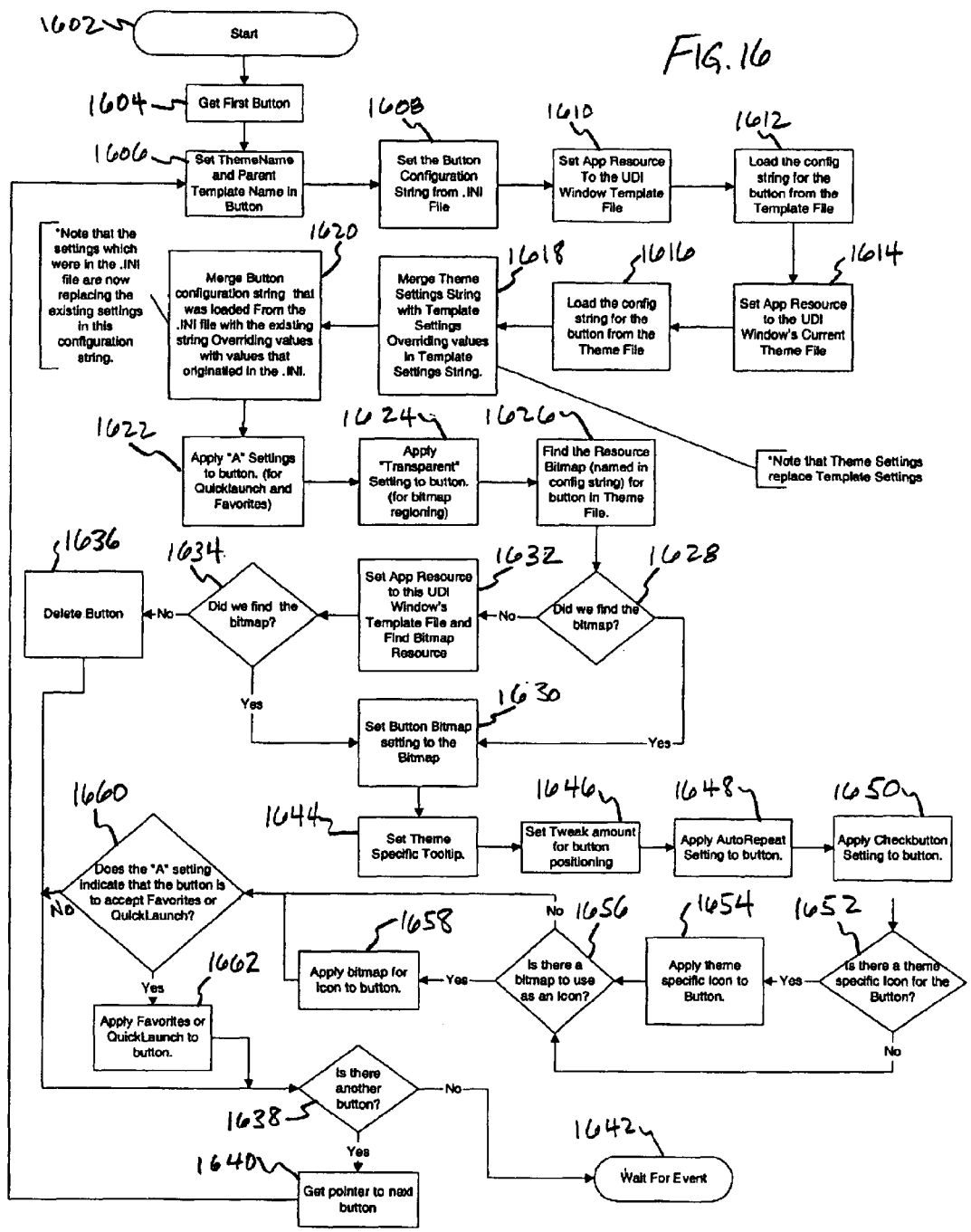

FIG. 16 further illustrated the process of step 1312 for applying various settings to the buttons created in FIG. 15. Thus, the steps illustrated in FIG. 16 are performed for each button for which a region was defined in FIG. 15. The flow starts at a step 1602 and proceeds to get a first button for processing at step 1604. At a step 1606 a theme name and parent template name are set for the button. Next, at a step 1608, the button configuration string from the .ini file is set. Next, at a step 1610, an application resource is set to the UDI template file. At a step 1612, the configuration string from the button for the template file is loaded. At a step 1614, the application resource is set to the UDI windows current theme file. At step 1616, the configuration string from the button is loaded from the theme file. At a step 1618, the theme settings string is merged with the template settings thereby overriding the values in the template setting string (i.e., theme settings are replaced by template settings).

At a step 1620, the button configuration that was loaded from the .ini file is merged with the existing string, thereby overriding values with values that originated in the .ini file. In other words, the settings that are in the .ini file are used to replace the existing settings in the configuration string. At steps 1622 through 1662, the available settings for UDI buttons (buttons are sometimes referred to as action, or click areas) that are defined in Table 1 are applied to the button. Thus, at step 1622 the "setting" is applied to the button to thereby associate Microsoft® Window Quicklaunch or Favorites with the Zenu™ UDI for easy access by the user.

At a step 1624 a transparent setting can be applied to the button. Transparency allows buttons, and the like, to be visible while at the same time allowing the underlying image to be partially visible. Various known transparency techniques can be employed, as would become apparent to a person skilled in the computer graphics art. At step 1622 a resource bitmap is located, if so specified in the configuration string for the button in the theme file. If a bitmap is located, as determined at step 1628, then the button bitmap is set to the located bitmap, at a step 1630. Otherwise, the application resource is set to the UDI windows template file and the associated bitmap resource is searched for, as shown at step 1632. If a template file bitmap resource is located, as determined at a step 1634, flow proceeds to 1630. Otherwise, the button is deleted as shown at a step 1636. If the button is deleted, further buttons can be processed, as determined at a step 1638. If so, a pointer to the next button is located, at a step 1640, and flow proceeds to step 1606.

After a bitmap is determined at either of step 1628 or step 1634, it is applied at step 1630. Next, a theme specific tool tip is set at a step 1644. Then, at step 1646, a "tweak" amount is set for button positioning. At a step 1548 an "auto repeat" feature is applied to the button if so desired. At step 1650, a "check button" setting is applied to the button if so desired.

Next, at a step 1652, it is determined whether a theme specific icon is specified for the button. If so, the theme specific icon is applied to the button, at step 1654. Otherwise, flow proceeds to a step 1656 to determine whether there is a bitmap to use as an icon. If so, the icon bitmap is applied to the button at a step 1658. Otherwise, flow proceeds to a step 1660.

At step 1660 it is determined whether the "A" setting indicates that the button is to accept Quicklaunch or Favorites features. If YES, the appropriate attributes are applied to the button at a step 1662. If not, flow proceeds to step 1638 so as to process any further buttons. Once all buttons are processed, flow continues back to step 1314 as shown at a step 1642.

These collections of styles that can be applied to a button (attributes, properties, or the like, e.g., a bitmap, a font, tool tip, flyover characteristic) have a particular precedence. Such characteristics are defined in the configuration file. If no such characteristics are found in the configuration file, the theme is searched. If such a characteristic is found in the theme it is applied. If no such characteristic is found in the theme, or it wasn't in the configuration file, the template is searched. If no such characteristic is located in the template, any predetermined default is applied. Thus, softer defaults as well as overrides at the template level, theme level, and user configuration level are available according to this embodiment of the present invention. The flow of FIG. 16 follows this iteration to determine what attributes to apply to the buttons. For example, the "set tweak amount" for positioning at step 1646 searches the configuration file and the theme to determine whether an modification has been made to the position of the button. In the case in which Zenu™ buttons are nested, in other words, clicking a button opens another level of buttons, each level of buttons has different parent templates, and a theme associated with each level. Thus, the position of buttons of a particular level is determined by their template and their appearance is determined by the theme of that level.

Turning again to the "waiting for an event" step 1314, two events can occur: a "button click", which is described in connection with FIGS. 17 and 18, or "a dropped file unbutton file event", which is described at FIG. 19.

Figure 17:
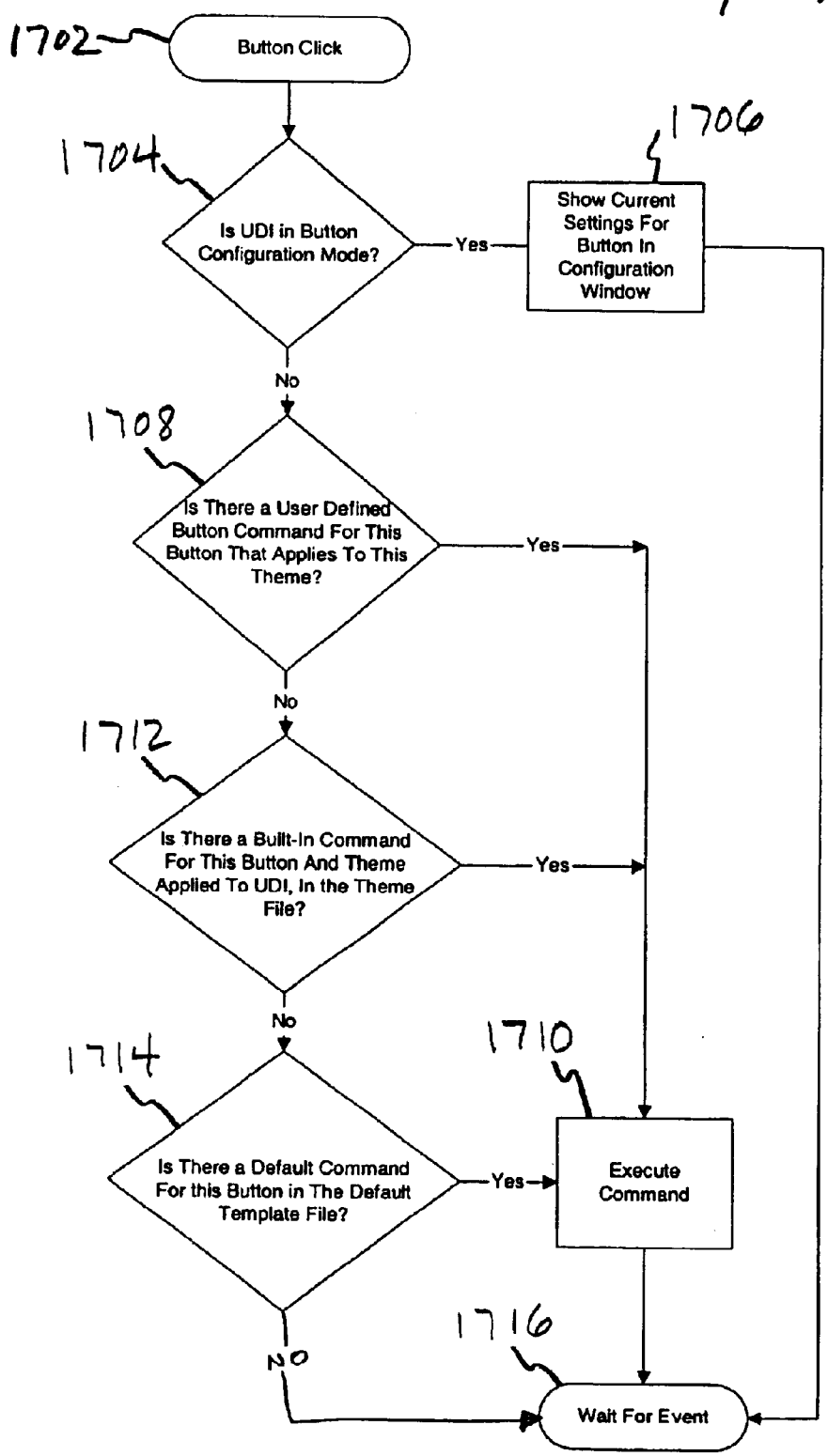
Figure 18:
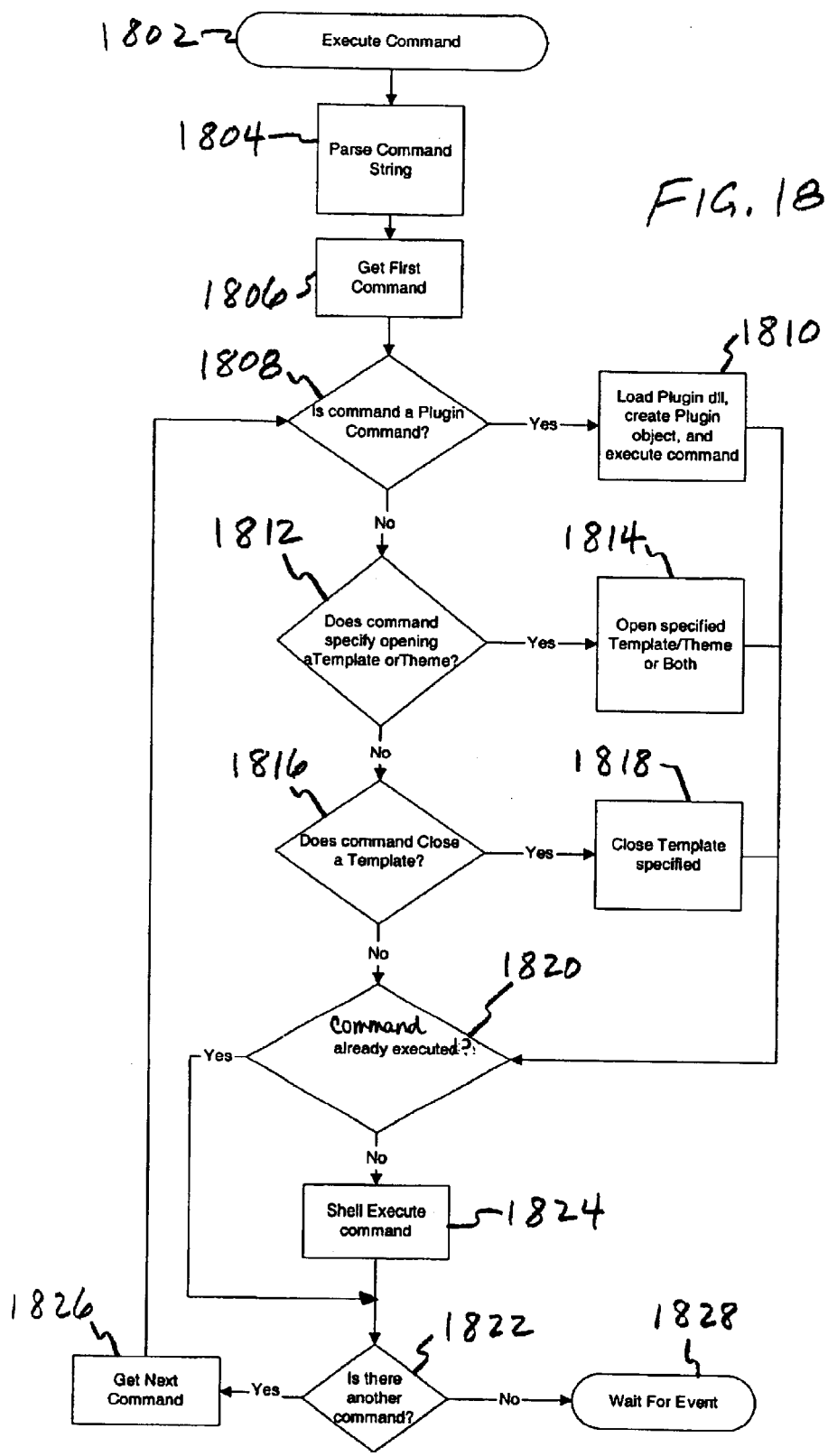

FIGS. 17 and 18 describe the process that occurs when a button is clicked. This process begins at a step 1702, and proceeds to determine whether the UDI is in button configuration mode, at a step 1704. If so, the current settings for the button are displayed in the configuration window at a step 1706. The process then enters the "wait for event" mode, at a step 1716 (which is equivalent to the wait for event step 1314). If not in the configuration mode, flow proceeds to a step 1708, which determines if there is a user defined button command for the button that applies to this theme. If so, the command is executed at a step 1710, then flow proceeds to step 1716. If no button command is defined, flow proceeds to step 1712 to determine if there is a built-in command for the button with the theme applied to the UDI as specified in the theme file. If YES, that command is then executed at step 1710. If not, flow proceeds to step 1714 to determine if a default command for the button is found in the default template file. If so, the default command is executed at step 1710. Otherwise, flow proceeds to step 1716 to wait for another event.

FIG. 18 illustrates the process for executing a command formed at step 1710. The execute command process begins at a step 1802. The command string is parsed at a step 1804. The syntax of the command string as described above in connection with Tables 1 and 2. Next, the first command is evaluated at a step 1806. If the command is a plug-in, as determined at a step 1808, the plug-in .dll is loaded to create a plug-in object and a command is executed at a step 1810. If the command is not a plug-in, it is determined whether the command specifies opening a template or theme, at a step 1812. If so, the theme, template, or both are opened, at a step 1814. Next, it is determined whether the command was to close a template, at a step 1816. If so, the closed template specified is performed, at a step 1818. As a result of steps 1810, 1814 and step 1818, or if the result of step 1816 is NO, it is next determined whether a command has been executed, at a step 1820. If YES, it is then determined whether there is another command in the string to process, at a step 1822. If so, the next command is obtained, at a step 1826, and flow proceeds to evaluate the command, at step 1808. If the result of the query in step 1820 is NO, a shell execute command is performed, at a step 1824. Control then proceeds after step 1824 to step 1822. If no other commands are to be executed in the string flow proceeds to step 1828 to wait for an event, which is the equivalent of "wait for event" step 1314.

Figure 19:
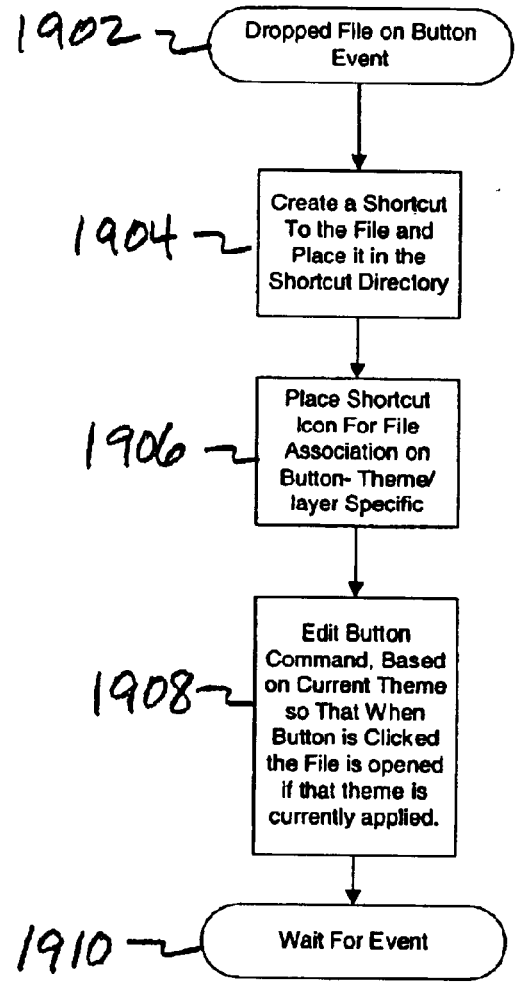

FIG. 19 illustrates the process for handling a "dropped file on button event." Flow begins at a step 1902. Next, a short-cut is created to the file that is dropped on the button, and that short-cut is placed in a Zenu™ short-cut directory, at a step 1904. Next, a short-cut icon for the file association is placed on the button and is modified according to the theme/layer specific characteristics, at a step 1906. Finally, the button command is edited based on the current theme, so that when the button is clicked the file is opened if that theme is currently applied, at a step 1908. The wait for event step is entered again at a step 1910.

IV Example Computer System and Computer Program Product Implementations

The Zenu™ UDI of the present invention can be implemented using hardware, software or a combination thereof and may be implemented in one or more computer systems or other processing systems. In fact, in one embodiment, the invention is directed toward one or more computer systems capable of carrying out the functionality described herein. An example of a computer system 2000 is shown in FIG. 20. The computer system 2000 includes one or more processors, such as processor 2004. Processor 2004 can support various operating systems such as Microsoft® Windows, Unix, Lixux, or the like. The processor 2004 is connected to a communication infrastructure 2006 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 2000 can include a display interface 2002 that forwards graphics, text, and other data from the communication infrastructure 2006 (or from a frame buffer not shown) for display on the display device 2030.

Computer system 2000 also includes a main memory 2008, preferably random access memory (RAM), and can also include a secondary memory 2010. The secondary memory 2010 can include, for example, a hard disk drive 2012 and/or a removable storage drive 2014, representing a floppy disk drive, a magnetic tape drive, an optical disk drive, or the like. The removable storage drive 2014 reads from and/or writes to a removable storage unit 2018 in a well known manner. Removable storage unit 2018, represents a floppy disk, magnetic tape, optical disk, of the like, which is read by and written to by removable storage drive 2014. As will be appreciated, the removable storage unit 2018 includes a computer usable storage medium having stored therein computer software and/or data.

In alternative embodiments, secondary memory 2010 can include other similar means for allowing computer programs or other instructions to be loaded into computer system 2000. Such means can include, for example, a removable storage unit 2022 and an interface 2020. Examples of such can include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 can also include a communications interface 2024.

Communications interface 2024 allows software and data to be transferred between computer system 2000 and external devices. Examples of communications interface 2024 can include a modem, a network interface (such as an Ethernet card), a communications port, a PCMCIA slot and card, infrared, radio frequency (RF), or the like. Software and data transferred via communications interface 2024 are in the form of signals 2028 which can be electronic, electromagnetic, optical or other signals capable of being received by communications interface 2024. These signals 2028 are provided to communications interface 2024 via a communications path (i.e., channel) 2026. This channel 2026 carries signals 2028 and can be implemented using wire or cable, fiber optics, a phone line, a cellular phone link, an RF link and other communications channels.

In this document, the terms "computer program medium" and "computer usable medium" are used to generally refer to media such as removable storage drive 2014, a hard disk installed in hard disk drive 2012, and signals 2028. These computer program products are means for providing software to computer system 2000. The invention is directed to such computer program products.

Computer programs (also called computer control logic) are stored in main memory 2008 and/or secondary memory 2010. Computer programs can also be received via communications interface 2024. Such computer programs, when executed, enable the computer system 2000 to perform the features of the present invention as discussed herein. In particular, the computer programs, when executed, enable the processor 2004 to perform the features of the present invention. Accordingly, such computer programs represent controllers or modules of the computer system 2000.

In an embodiment where the invention is implemented using software, the software can be stored in a computer program product and loaded into computer system 2000 using removable storage drive 2014, hard drive 2012 or communications interface 2024. The control logic or modules (software), when executed by the processor 2004, causes the processor 2004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. This is especially true in light of technology and terms within the relevant art(s) that may be later developed.

The present invention has been described above with the aid of functional building blocks or modules (see FIGS. 11 and 20, for example) illustrating the performance of specified functions and relationships thereof. The boundaries of these functional building blocks have been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method, comprising:
   (a) displaying a user definable interface (UDI) in a selectable position within a display of an apparatus relative to any pointer position upon activation by a user, wherein the UDI has a plurality of levels each having a plurality of command regions, wherein only one of the levels appears at a given time, and the UDI is displayed in a relative position about the pointer position;
   (b) selecting a visual appearance of the UDI including a shape, and number of the command regions, the visual appearance remaining substantially the same for each of the plurality of levels; and
   (c) assigning a command to each of the plurality of command regions for each respective one of the plurality of levels by dragging and dropping from one or more applications of the apparatus.

2. The method of claim 1, wherein step (c) further comprises:
   (d) permitting the user to form a first group of buttons and at least a second group of buttons;
   (e) permitting the user to assign a first icon representing a first specific one of the one or more applications to a first given button of the first group;
   (f) permitting the user to assign commands, associated with the first specific one of the one or more applications to the second group of buttons;
   (g) permitting the user to assign a second icon representing a second specific one of the one or more applications to a second given button of the first group; and
   (h) permitting the user to assign commands, associated with the second specific one of the one or more applications to the second group of buttons;
      wherein the appearance of, and commands associated with, the second group of buttons change based on which button of the first group of buttons is selected.

3. The method of claim 1, wherein activation by the user comprises at least one of:
   clicking a hotkey;
   clicking a mouse button; and
   turning on the apparatus.

4. The method of claim 1, wherein before step (c) the method comprises:
   selecting a visual appearance of each of the command regions including at least one of a shape and a location within the UDI.

5. In an apparatus with a user-defined interface (UDI) having a plurality of levels, each having a plurality of command regions, a method comprising:
   (a) providing a command processor that manages an interactive skin (IS) whose visual appearance, which includes a shave and number of the command regions, remains substantially the same at each of the plurality of levels, wherein only one of the levels appears at a give time, the IS having
      i. a template that defines at least one of position information and visual appearance information for the plurality of command regions in each respective one of the levels of the UDI and at least one of default attributes and default commands for the plurality of command regions, and ii. a theme that defines at least one of
(1) attributes if the template only defines default commands for the plurality of command regions, and
(2) commands if the template only defines default attributes for the plurality of command regions; and (b) providing a customizer that permits at least one of user replacing and user extending of at least one of the default attributes and the default commands of at least one of the plurality of command regions.

6. The method of claim 5, wherein the customizer permits a user to hide the UDI.

7. The method of claim 5, wherein the customizer permits a user to hide a portion of the UDI.

8. The method of claim 5, wherein the customizer permits a user to have the UDI display upon launch.

9. The method of claim 5, wherein the customizer permits a user to launch the UDI from a system tray.

10. The method of claim 5, wherein the UDI is displayed in a relative position about a pointer position.

11. The method of claim 10, wherein the customizer permits a user to define the relative position.

12. The method of claim 5, wherein the customizer permits a user to scale the size of the UDI.

13. In a system having a user defined interface (UDI), a method comprising:
(a) managing the UDI in response to user commands;
(b) providing at least one template defining a visual appearance of the UDI, which includes a share and number of command regions, the visual appearance remaining substantially the same at each of a plurality of levels, wherein only one of the levels appears at a given time, the at least one template defining at least one of a position and a appearance for a plurality of command regions corresponding to each level of the UDI; and
(c) providing a theme that defines attributes and commands for the plurality of command regions.

14. An apparatus, comprising:
(a) a user defined interface (UDI) having a visual appearance, which includes a shape and number of command regions, the visual appearance remaining substantially the same at each of a plurality of levels, wherein each of the plurality of levels has a plurality of command regions, wherein only one of the levels appears at a given time;
(b) a command processor that manages an interactive skin (IS) having
i. a template that defines at least one of position information and visual appearance for the plurality of command regions in the UDI and at least one of default attributes and default commands for the plurality of command regions, and
ii. a theme that defines at least one of
(1) attributes if the template only defines default commands for the plurality of command regions, and
(2) commands if the template only defines default attributes for the plurality of command regions; and
(c) a customizer that permits at least one of user replacing and user extending of at least one of the default attributes and the default commands of at least one of the plurality of command regions.

15. The apparatus according to claim 14, wherein the user is an end user.

16. A computer program product comprising a computer usable medium having control logic stored therein for controlling an apparatus having a display, said control logic comprising:
a first computer readable program code means for causing the apparatus to display a user definable interface (UDI) in a selectable position within the display relative to any pointer position upon activation by a user, wherein the UDI has a plurality of levels each having a plurality of command regions, wherein only one of the levels appears at a given time, and the UDI is displayed in a relative position about the pointer position;
a second computer readable program code means for causing the apparatus to permit the user to select a visual appearance, which includes a shape, and number of command regions;
a third computer readable program code means for causing the visual appearance to remain substantially the same for each of the plurality of levels; and
a fourth computer readable program code means for causing the apparatus to permit the user to assign a command to each of the plurality of command regions for each respective one of the plurality of levels by dragging and dropping from one or more applications of the apparatus.

17. The computer program product of claim 16, further comprising:
a fifth computer readable program code means for causing the computer to permitting the user to form a first group of buttons and at least a second group of buttons;
a sixth computer readable program code means for causing the computer to permit the user to assigns a first icon representing a first specific one of the one or more applications to a first given button of the first group;
a seventh computer readable program code means for causing the computer to permit the user to assign commands, associated with the first specific one of the one or more applications to the second group of buttons;
a eighth computer readable program code means for causing the computer to permit the user to assigns a second icon representing a second specific one of the one or more applications to a second given button of the first group; and
a ninth computer readable program code means for causing the computer to permit the user to assign commands, associated with the second specific one of the one or more applications to the second group of buttons;
wherein the appearance of, and commands associated with the second group of buttons change based on which button of the first group of buttons is selected.

18. The computer program product of claim 16, further comprising:
a fifth computer readable program code means for selecting at least one of a shape and a location within the UDI for each of the plurality of command regions at each respective one of the levels.

19. A computer program product comprising an apparatus usable medium having a user defined interface (UDI) comprising:
a first computer readable program code means for causing the apparatus to provide a command processor to manage the UDI;

a second computer readable program code means for causing the apparatus to provide at least one template defining a shape and number of command regions for the UDI, the visual appearance remaining substantially the same at each of a plurality of levels, wherein only one of the levels appears at a given time, the at least one template defining at least one of positions and appearances for a plurality of the command regions corresponding to each level of the UDI; and a third computer readable program code means for causing the apparatus to provide a theme that defines attributes and commands for the for the plurality of command regions.

20. An apparatus comprising:

means for displaying a user definable interface (UDI) in any selectable position within a display relative to a pointer position upon activation by a user, wherein the UDI has a plurality of levels each having a plurality of command regions, wherein only one of the levels appears at a given time, and the UDI is displayed in a relative position about the pointer position;

means for permitting the user to select a visual appearance of the UDI, which includes a shape and number of command regions the visual appearance remaining substantially the same for each level of the plurality of levels, wherein only one of the levels appears at a given time; and means for permitting the user to assign a command to each of the plurality of command regions for each respective one of the levels by dragging and dropping from one or more applications of the apparatus.

21. The apparatus of claim 20, wherein said means for permitting the user to assign a command further comprises:

means for permitting the user to form a first group of buttons and at least a second group of buttons;

means for permitting the user to assign a first icon representing a first specific one of the one or more applications to a first given button of the first group;

means for permitting the user to assign commands, associated with the first specific one of the one or more applications to the second group of buttons;

means for permitting the user to assign a second icon representing a second specific one of the one or more applications to a second given button of the first group; and means for permitting the user to assign commands, associated with the second specific one of the one or more applications to the second group of buttons; wherein the appearance of, and commands associated with, the second group of buttons change based on which button of the first group of buttons is selected.

22. The apparatus of claim 20, wherein activation by the user comprises at least one of:

clicking a hotkey;

clicking a mouse button; and turning on the apparatus.

23. The apparatus of claim 20, further comprising:

means for permitting the user to select at least one of a visual appearance or location in the UDI for each of the plurality of command regions at each respective one of the levels.

24. An apparatus comprising:

(a) a user-defined interface (UDI) having a visual appearance, which includes a shape and number of command regions, the visual appearance remaining substantially the same at each of a plurality of levels, wherein only one of the levels appears at a given time;

(b) command processor means for managing an interactive skin (IS) having
  i. a template that defines at least one of position information and visual appearance for the plurality of command regions corresponding to the UDI and at least one of default attributes and default commands for the plurality of command regions, and
  ii. a theme that defines at least one of
    (1) attributes if the template only defines default commands for the plurality of command regions, and
    (2) commands if the template only defines default attributes for the plurality of command regions; and (c) customizer means that permits at least one of user replacing and user extending of at least one of the default attributes and the default commands of at least one of the plurality of command regions.

25. The apparatus of claim 24, wherein said customizer means permits a user to hide the UDI.

26. The apparatus of claim 24, wherein said customizer means permits a user to hide a portion of the UDI.

27. The apparatus of claim 24, wherein said customizer means permits a user to have the UDI display upon launch.

28. The apparatus of claim 24, wherein said customizer means permits a user to launch the UDI from a system tray.

29. The apparatus of claim 24, wherein the UDI is displayed in a relative position about a cursor position.

30. The apparatus of claim 29, wherein the customizer permits a user to define the relative position.

31. The apparatus of claim 24, wherein the customizer permits a user to scale the size of the UDI.

* * * * *

UNITED STATES PATENT AND TRADEMARK OFFICE
CERTIFICATE OF CORRECTION

PATENT NO. : 6,918,091 B2  
DATED : July 12, 2005  
INVENTOR(S) : Leavitt et al.

It is certified that error appears in the above-identified patent and that said Letters Patent is hereby corrected as shown below:

Column 7,  
Line 63, replace "1. Title Operation" with -- A. Title Operation --.

Column 9,  
Line 22, replace "These example" with -- These examples --.

Column 14,  
Line 16, replace "can presents user" with -- can present users --.

Column 20,  
Line 60, replace "shave" with -- shape --.

Column 21,  
Line 32, replace "share" with -- shape --.  
Line 37, replace "and a appearance" with -- and an appearance --.

Signed and Sealed this

Twenty-third Day of May, 2006

JON W. DUDAS  
*Director of the United States Patent and Trademark Office*